US012379881B2

(12) United States Patent
Takasaki

(10) Patent No.: US 12,379,881 B2
(45) Date of Patent: Aug. 5, 2025

(54) PRINTING CONTROL APPARATUS, PRINTING CONTROL METHOD, AND STORAGE MEDIUM

(71) Applicant: CANON KABUSHIKI KAISHA, Tokyo (JP)

(72) Inventor: Tetsuhide Takasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/584,155

(22) Filed: Feb. 22, 2024

(65) Prior Publication Data
US 2024/0192901 A1 Jun. 13, 2024

Related U.S. Application Data

(63) Continuation of application No. 17/728,030, filed on Apr. 25, 2022, now Pat. No. 11,947,844.

(30) Foreign Application Priority Data

Apr. 30, 2021 (JP) .................. 2021-077448

(51) Int. Cl.
G06F 3/12 (2006.01)
H04N 1/00 (2006.01)
(52) U.S. Cl.
CPC .......... G06F 3/1208 (2013.01); G06F 3/1256 (2013.01); H04N 1/0048 (2013.01); G06F 3/1204 (2013.01)
(58) Field of Classification Search
None
See application file for complete search history.

(56) References Cited

U.S. PATENT DOCUMENTS 8,077,348 B2 * 12/2011 Sato .................. H04N 1/54
358/1.9
8,854,674 B2 10/2014 Kirihata
(Continued)

FOREIGN PATENT DOCUMENTS

EP 3726826 A1 10/2020
JP 2004-177782 A 6/2004
(Continued)

OTHER PUBLICATIONS

European Search Report dated Sep. 20, 2022, in related European Patent Application No. 22170465.3.
Anonymous: "How to Use Indesign Separations Preview | Designfreebies", Jan. 20, 2021 (Jan. 20, 2021), pp. 1-4, SP055957166, URL:https://web.archive.org/web/20210120193319/http://www.designfrebiew.org/design-templates/how-to-use-indesign-separations-preview/ [retrieved on Sep. 2, 2022].
(Continued)

Primary Examiner — Darryl V Dottin
(74) Attorney, Agent, or Firm — VENABLE LLP

(57) ABSTRACT

A display control method includes the steps of obtaining a first preview image resolution for checking a printing layout, obtaining a second preview image resolution for checking a spot color printing portion where the spot color printing is carried out, and displaying a spot color preview image for checking the spot color printing portion by using a resolution based on the first preview image resolution and the second preview image resolution. The first preview image resolution is calculated and obtained based on a print setting included in the print data and on a size of a region where display is carried out in the preview image displaying step, and the second preview image resolution is calculated and obtained based on a drawing command included in the print data and on the size of the region where display is carried out in the preview image displaying step.

12 Claims, 20 Drawing Sheets

(56) References Cited

U.S. PATENT DOCUMENTS

| | | | |
|---|---|---|---|
| 8,891,129 B2 | 11/2014 | Hayashi | |
| 10,831,418 B1* | 11/2020 | Morales | G06F 3/1208 |
| 10,949,137 B2 | 3/2021 | Miyasaka | |
| 11,842,110 B2 | 12/2023 | Takasaki | |
| 2003/0053147 A1* | 3/2003 | Cheng | H04N 1/00795 |
| | | | 358/527 |
| 2003/0072038 A1 | 4/2003 | Cheng | |
| 2019/0132487 A1* | 5/2019 | Kishimoto | H04N 1/6075 |

FOREIGN PATENT DOCUMENTS

| | | |
|---|---|---|
| JP | 2013-091294 A | 5/2013 |
| JP | 2013-131983 A | 7/2013 |
| JP | 2017-076160 A | 4/2017 |
| JP | 2020-107198 A | 7/2020 |

OTHER PUBLICATIONS

Anonymous: "Adobea Indesigna CS3 User Guide", Jan. 1, 2007, pp. 1-672, Jan. 1, 007 (Jan. 1, 2007), XP007921844, Retrieved from the Internet: URL:http://help.adobe.com/archive/en_US/indesign_incopy/cs3/indesign_cs3_help.pdf.

Anonymous: "Hoe werken tabs in InDesign?—Opatel Opleidingen", Apr. 19, 2016 (Apr. 19, 2016), XP055857220, Retrieved from the Internet: URL://www.opatel.nl/tabs-in-indesign [retrieved on Sep. 2, 2022].

Japanese Office Action dated Jan. 7, 2025, in related Japanese Patent Application No. 2021-077448.

* cited by examiner

PRINT SETTING — 400

- 401 PRINTER: Large Format Printer
- 402 NUMBER OF COPIES: 1
- 403 PAGES: ● ALL
  - ○ START: 1    END: 1   — 404
- 405 PAPER SIZE: A2    420 x 594mm
- 406 PAPER TYPE: COATED PAPER
- 407 PRINT QUALITY: STANDARD
- 408 FEEDING MODE: ROLLED PAPER SPOT COLOR PRINTING: ☑ FLUORESCENT PINK(RGB: 0xFF, 0x00, 0xFF) — 409
☐ ORANGE(RGB: 0xFF, 0x55, 0x00) — 410
☑ PRINT PREVIEW — 411

CANCEL — 412    PRINT — 413

FIG.4

| | FILL COLOR | | | LINE COLOR | | | LINE WIDTH (pt) | DRAWING SIZE w x h (pt) |
|---|---|---|---|---|---|---|---|---|
| | R | G | B | R | G | B | | |
| 500 | 0 (0x00) | 255 (0xFF) | 80 (0x50) | 0 (0x00) | 255 (0xFF) | 80 (0x50) | 8.0 | - |
| 501 | 255 (0xFF) | 255 (0xFF) | 0 (0x00) | 0 (0x00) | 0 (0x00) | 0 (0x00) | 8.0 | - |
| 502 | 255 (0xFF) | 255 (0xFF) | 0 (0x00) | 0 (0x00) | 0 (0x00) | 0 (0x00) | 8.0 | - |
| 503 | 255 (0xFF) | 255 (0xFF) | 0 (0x00) | 0 (0x00) | 0 (0x00) | 0 (0x00) | 8.0 | - |
| 504 | 255 (0xFF) | 0 (0x00) | 255 (0xFF) | - | - | - | - | 784.8 x 237.6 |
| 505 | 255 (0xFF) | 0 (0x00) | 0 (0x00) | 255 (0xFF) | 0 (0x00) | 0 (0x00) | 4.0 | - |
| 506 | 255 (0xFF) | 255 (0xFF) | 255 (0xFF) | - | - | - | - | 813.6 x 93.6 |
| 507-1 | 255 (0xFF) | 255 (0xFF) | 255 (0xFF) | 230 (0xE6) | 0 (0x00) | 230 (0xE6) | 2.0 | - |
| 507-2 | 255 (0xFF) | 255 (0xFF) | 255 (0xFF) | 255 (0xFF) | 0 (0x00) | 255 (0xFF) | 1.0 | - |

```
601 — "Destination"="Large Format Printer"
602 — "Copies"=1
603 ⎰ "PageStart"=1
    ⎱ "PageEnd"=1
604 — "PaperType"="CoatedPaper"
605 — "Resolution"="600dpi"
606 — "PaperSource"="RollTray"
     ⎧ "PaperSize"="A2"
     ⎪ "PaperWidth"=42000
     ⎪ "PaperHeight"=59400
607 ⎨ "MarginTop"=300
     ⎪ "MarginBottom"=300
     ⎪ "MarginLeft"=300
     ⎩ "MarginRight"=300
608 — "SpotColorPink"="On"
609 — "SpotColorOrange"="Off"
610 — "PrintPreview"="On"
611 — "document-format"="application/pdf"
```

FIG.6

| No. | Origin X | Origin Y | Width(pix) | Height(pix) |
|---|---|---|---|---|
| 1 | 46 | 548 | 390 | 70 |

FIG.15

| x | y | CHECKED |
|---|---|---|
| . | . | . |
| . | . | . |
| . | . | . |
| 500 | 1800 | 1 |
| 501 | 1800 | 1 |
| 502 | 1800 | 1 |
| 503 | 1800 | 0 |
| 504 | 1800 | 0 |
| . | . | . |
| . | . | . |
| . | . | . |

FIG.18

PRINTING CONTROL APPARATUS, PRINTING CONTROL METHOD, AND STORAGE MEDIUM

This application is a continuation of application Ser. No. 17/728,030, filed Apr. 25, 2022.

BACKGROUND OF THE INVENTION

Field of the Invention

The present invention relates to a printing control apparatus, a printing control method, and a storage medium which enables check of a printing layout and a spot color print region on a print preview.

Description of the Related Art

Japanese Patent Laid-Open No. 2013-091294 discloses a technique to display an image in the same size as an image to be formed on a print sheet as an actual size preview image in a case of an instruction to perform certain processing such as scaling processing. This technique makes it possible to prevent a printing failure by printing characters in an unintended size.

In the meantime, spot color printing has been put into practice by replacing information on a specific color (RGB values) with a predetermined special color in the course of printing.

There has been a demand for avoiding the occurrence of an unintended result in the case of carrying out the spot color printing.

SUMMARY OF THE INVENTION

Given the circumstance, the present invention provides a printing control apparatus, a printing control method, and a storage medium, which can suppress the occurrence of an unintended printing result.

A printing control method according to the present invention is a printing control method designed to instruct an image output apparatus to perform printing based on print data, the image output apparatus being configured to perform special printing by using a coloring material of a specific color, the printing control method including: a first obtaining step of obtaining a first preview image resolution for checking a printing layout; a second obtaining step of obtaining a second preview image resolution for checking a special printing portion where the special printing is carried out; and a preview image displaying step of displaying a special printing portion check preview image by using a resolution based on the first preview image resolution obtained in the first obtaining step and the second preview image resolution obtained in the second obtaining step.

According to the present invention, it is possible to provide a printing control apparatus, a printing control method, and a storage medium, which can suppress the occurrence of an unintended printing result.

Further features of the present invention will become apparent from the following description of exemplary embodiments with reference to the attached drawings.

BRIEF DESCRIPTION OF THE DRAWINGS

FIG. 4 is a diagram showing a print setting dialogue;

FIG. 6 is a diagram schematically showing a print setting ticket;

FIG. 15 is a diagram showing a storage format of a region of pixels to be stored;

FIG. 18 is a table showing a storage format of coordinates of pixels;

DESCRIPTION OF THE EMBODIMENTS

First Embodiment

A first embodiment of the present invention will be described below with reference to the drawings.

Figure 1:
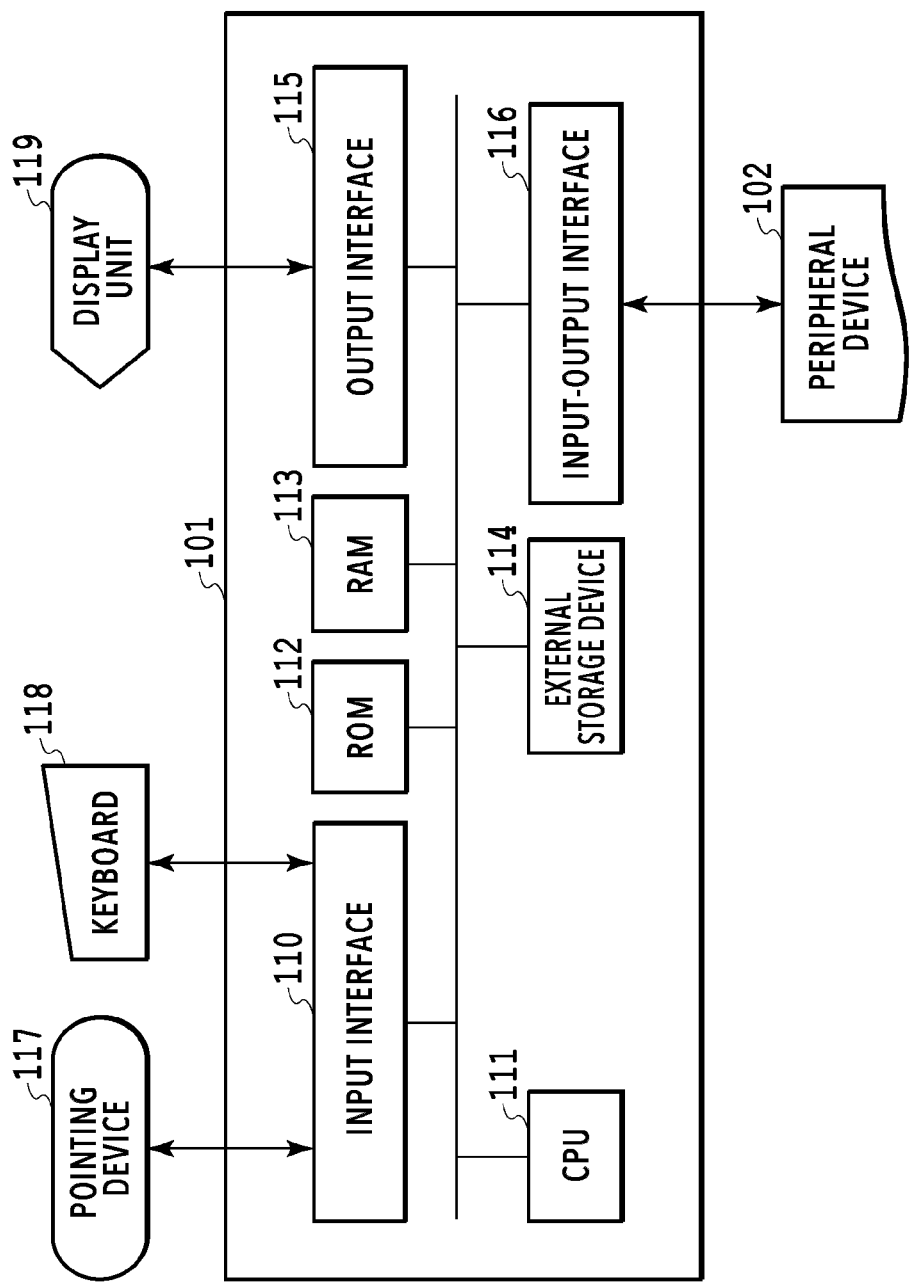
FIG. 1 is a block diagram showing a hardware configuration of a printing system.

FIG. 1 is a block diagram showing a hardware configuration of a printing system according to the present embodiment. An information processing apparatus 101 is an example of an information processing apparatus, which includes an input interface 110, a CPU 111, a ROM 112, a RAM 113, an external storage device 114, an output interface 115, and an input-output interface 116. Meanwhile, input devices such as a keyboard 118 and a pointing device 117 are connected to the input interface 110, and a display device such as a display unit 119 is connected to the output interface 115.

An initialization program is stored in the ROM 112. A group of application programs, an operating system (OS), a printer driver, and other various data are stored in the external storage device 114. The RAM 113 is used, for example, as a work memory in executing various programs stored in the external storage device 114.

A peripheral device (an image output device) 102 is connected to the information processing apparatus 101 through the input-output interface 116. Here, the information processing apparatus 101 and the peripheral device 102 are separately provided. However, these structures may be integrated into a single information processing apparatus instead. Although an ink jet printer configured to perform printing by ejecting inks onto a sheet surface will be described as an example of the peripheral device, the printing may be executed in accordance with a different method (such as an electrophographic method).

In the present embodiment, the ink jet printer equipped with a spot color ink will be described as an example. Moreover, a large-format ink jet printer capable of printing on a print medium in a large size such as A0 and B0 sizes will be described as an example of the peripheral device 102 in the present embodiment. In the meantime, the information processing apparatus 101 may be any of a desktop personal computer, a smartphone, and a notebook personal computer.

Figure 2:
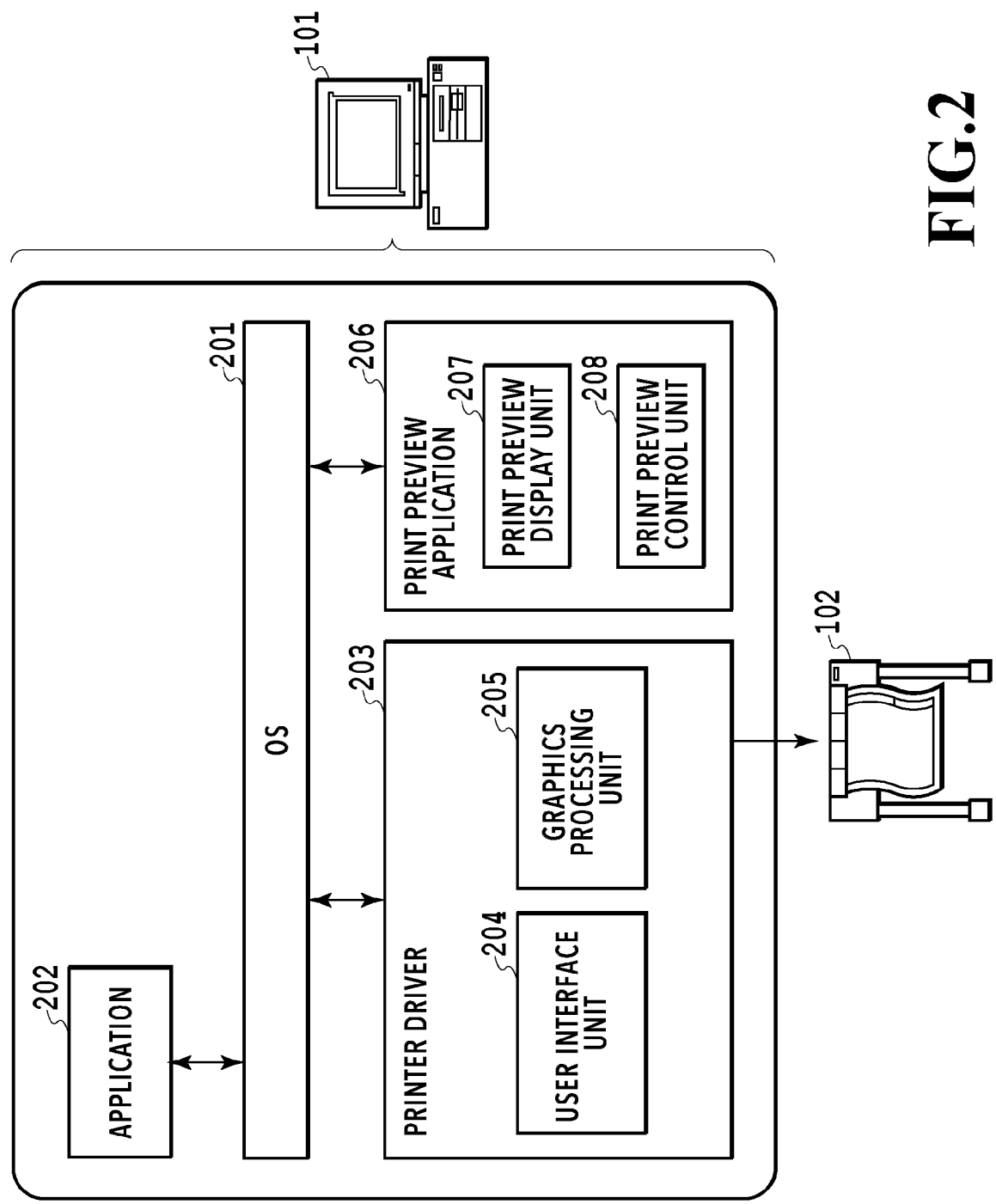
FIG. 2 is a block diagram showing a configuration of the printing system that performs spot color printing.

FIG. 2 is a block diagram showing a configuration of a printing system that performs spot color printing (special printing). The spot color printing is a printing mode that uses an ink of a special color (a spot color ink) other than ordinary inks. Moreover, the "ordinary inks" are inks used for performing process color printing, which are the inks of colors each forming a basis of a process color, such as cyan (C), magenta (M), yellow (Y), and black (K) inks. Meanwhile, the process color is a color expressed either by one of the CMYK colors or by a combination of two or more colors of the CMYK colors. In the meantime, a fluorescent pink ink and a fluorescent orange ink are used as the spot color inks in the present embodiment. A spot color is a color that is different from the process color, which cannot be expressed by one of the CMYK colors or a combination of two or more colors of the CMYK colors. However, the present invention is not limited only to this configuration and the number and colors of the spot color inks may be arbitrarily determined, and an ink of a color which is not a fluorescent color is also applicable. For example, a violet ink, a green ink, an orange ink, a gold ink, a silver ink, or the like may be used as the spot color ink. Meanwhile, inks of other metallic colors are also applicable. In addition, an ink prepared by mixing a special color ink with another ink (such as an ordinary ink) may also be treated as the special color ink. An application 202 is software that creates contents to be printed. For example, an image editing application to create poster data corresponds to the application 202. A user designates specific RGB data values on the application 202 concerning characters and graphic image data for which the user wishes to carry out the spot color printing to be described later. Upon receipt of a print request from the user, the application 202 issues a print instruction to an OS 201. Upon receipt of the print instruction, the OS 201 assigns an OS printing system (not shown) included in the OS 201 to perform processing concerning the subsequent printing. The following description will be given on the assumption that the OS printing system carries out actions in cooperation with a printer driver 203 provided by a vendor of the image output device.

Upon receipt of a print request from the application 202, the OS printing system requests the printer driver 203 to display a print setting screen, and the printer driver 203 displays the print setting screen on a user interface unit 204. Although the print setting screen will be described later, a paper size, a paper type, and the like can be designated on the print setting screen and the spot color printing can also be designated thereon. Moreover, in the case where print preview display setting provided on the print setting screen is carried out and the print instruction is carried out on the print setting screen, the OS printing system, the application 202, and the printer driver 203 carry out a cooperative operation, thereby activating a print preview application 206 before printing.

Print data to be printed is delivered as a spool file from the application 202 to the print preview application 206 through the OS printing system. The present embodiment shows an example of using a PDF file as a format of the spool file. However, the format of the spool file is not limited to the foregoing. Meanwhile, the print setting set up on the print setting screen is delivered from the printer driver 203 to the print preview application 206 through the OS printing system. The present embodiment shows an example of using the print setting in a ticket format as a format of the print setting. However, the format of the print setting is not limited to the foregoing.

Thereafter, a print preview control unit 208 creates a preview print image and printing layout information by using the spool PDF file and the print setting ticket, and a print preview display unit 207 displays a preview in such a way that one page of the print data fits into one screen. Meanwhile, the print preview application 206 is also provided with a spot color print preview function to display a preview of a spot color printing portion (a special printing portion), so that the user can check before the printing as to which part of the image the spot color ink will be used in. In the case where the user checks a printing image and a printing layout and confirms that a desired result is being printed out, the user conducts the print instruction by using the print preview application 206.

In response to the print instruction from the print setting screen or the print preview application 206, the spool PDF file and the print setting ticket on the application 202 are delivered to a graphics processing unit 205 of the printer driver 203 through the OS printing system. The graphics processing unit 205 converts these data into a data format interpretable by the peripheral device 102, and transmits the converted data to the peripheral device 102. In the present embodiment, the spool PDF file is converted into an image data format interpretable by the peripheral device 102 through a rendering engine installed in the OS printing system or the graphics processing unit 205 in accordance with the print setting.

Thereafter, an image is formed on a print medium fed to the peripheral device 102 by ejecting inks from a print head to the print medium. Here, in the case where the spot color printing is set, the designated spot color ink is ejected for forming an image at a data portion of the print data to which the spot color printing is designated.

The present embodiment will describe an example of the peripheral device 102, in which the peripheral device 102 can perform printing while using two types of spot color inks in the case where the spot color printing is set by using the printer driver 203. In the case where the spot color printing is set by using the printer driver 203, pixels having specific RGB values corresponding to a set spot color in the print data are printed by using the spot color ink. In the present embodiment, the specific RGB values are R=255 (0xFF), G=0 (0x00), and B=255 (0xFF), for example. The pixels having the corresponding RGB values are printed in a fluorescent pink color by using the fluorescent pink ink. Alternatively, the specific RGB values are R=255 (0xFF), G=85 (0x55), and B=0 (0x00), for example. The pixels having the corresponding RGB values are printed in an orange color by using the fluorescent pink ink mixed with the M and Y inks. Here, in a case of a mode that enables the use of an orange ink as the spot color ink, for example, then the pixels may be printed in the orange color by using the orange ink only. Specifically, the pixels having the specific RGB values corresponding to the spot color only need to be printed by using at least the spot color ink, and may be or may not be printed by using the ink mixed with any of the CMYK inks. Note that the pixels not having the specific RGB values corresponding to the spot color are printed by using the CMYK inks only even in the spot color printing. In the meantime, the spot color printing is executed in the case where the spot color printing is activated by a user operation. In other words, if a spot color print setting is not activated, then the pixels having the specific RGB values corresponding to the spot color are printed by using the CMYK inks only with reference to the RGB values as usual.

In the case where the printer driver 203 activates the spot color print setting and the RGB values of the pixels included in the print data are R=255 (0xFF), G=0 (0x00), and B=255 (0xFF), the peripheral device can perform the spot color printing by using the fluorescent pink ink. Meanwhile, in the case where the printer driver 203 activates the spot color print setting and the RGB values of the pixels included in the transmitted print data are R=255 (0xFF), G=85 (0x55), and B=0 (0x00), it is possible to perform the spot color printing by using a fluorescent orange ink. On the other hand, in the case where the pixels having any of the above-mentioned specific RGB values corresponding to the spot color printing are not included in the print data in spite of activation of the spot color printing by the printer driver 203, it is not feasible to carry out the spot color printing. In the case where the spot color printing is infeasible, an error (a warning) is notified in the present embodiment.

In the case of performing the spot color printing, the user creates a content on the application 202 to begin with. Then, the user designates the specific RGB data values corresponding to any of the above-mentioned spot color inks to characters or a specific region on the graphic image data that the user wants to print by using the spot color ink.

Figure 3:
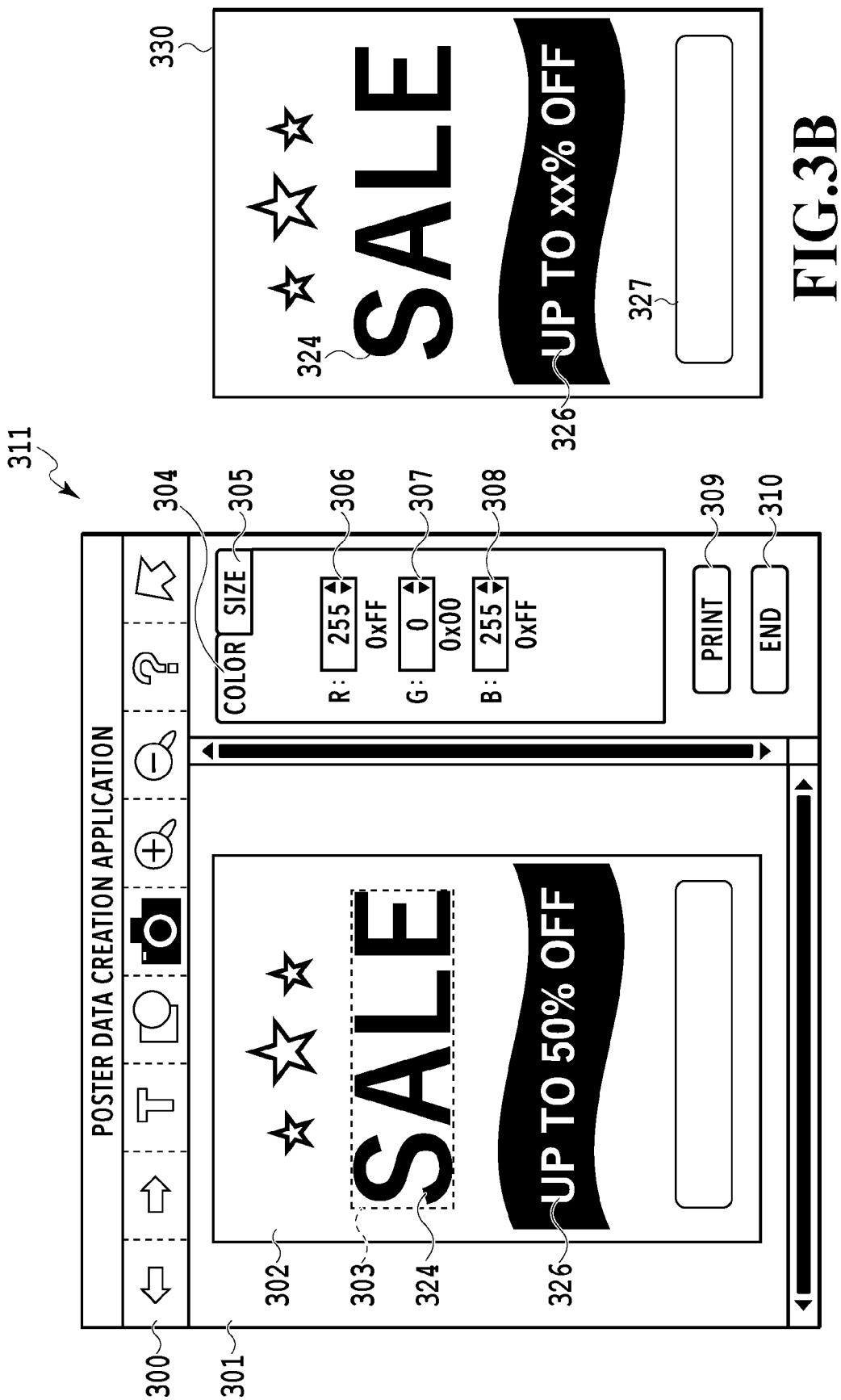
FIG. 3A is a diagram showing a screen example of a poster data creation application.
FIG. 3B is another diagram showing the screen example of the poster data creation application.

FIGS. 3A and 3B are diagrams showing an example of the application 202 in the present embodiment, which are diagrams showing a screen example of a poster data creation application 311. Using this application, the user edits template data 330 in the present embodiment, which is created either by the user or by a third party. The poster data creation application 311 includes toolbar buttons 300, an image data display region 301, an image data editing region 302, an object selecting frame 303, an object color editing tab menu 304, and an object resizing tab menu 305. Moreover, the poster data creation application 311 includes an R value change control item 306, a G value change control item 307, a B value change control item 308, a print button 309, and an end button 310.

The toolbar buttons 300 are used for selecting application functions such as cancellation and redoing of an editing operation, creation of a text object, creation of a graphic object, creation of an image data object, change of a display magnification, display of help for the application, and selection of an object. The image data display region 301 displays image data created by the user. In the image data editing region 302, the user can select an arbitrary object, move the selected object, and edit the image data by using the pointing device 117. The object selecting frame 303 shows a selected object in the case where the user selects the relevant object.

In this example, the user selects a text object 324 stating "SALE" in order to print this object in the fluorescent pink spot color.

In the case where the object color editing tab menu 304 is selected, a control item is displayed for changing a color of the object that is currently selected. In the case where the object resizing tab menu 305 is selected, a control item is displayed for changing the size of the currently selected object. Here, the object color editing tab menu 304 is selected and the R value change control item 306, the G value change control item 307, and the B value change control item 308 are displayed for changing the RGB values of the object.

Each control item for the R value, the G value, and the B value can set a value from 0 to 255 by directly inputting a value by using the keyboard 118 or selecting a button on the right side of each control item by using the pointing device 117. Meanwhile, the inputted value is also indicated below each control item in a hexadecimal number. In this example, the RGB values of the text object 324 stating "SALE" surrounded by the object selecting frame 303 are set to R=255 (0xFF), G=0 (0x00), and B=255 (0xFF). As described above, these RGB values are the values for designating the color to be printed by using the ink of the specific color. Moreover, the user is assumed to have edited a text object 326 from template data stating "UP TO xx % OFF" to "UP TO 50% OFF".

In the present embodiment, a data creation color space of the application 202 and a color space of the print data created by a rendering engine of the printer driver 203 are defined as sRGB color spaces that stand for standard RGB color spaces. Moreover, an effect of color matching processing is assumed to be negligible for the purpose of simplifying the explanation. Meanwhile, the data creation color space of the application 202 and a color space of the print data created by the rendering engine of the OS printing system are also defined as the sRGB color spaces that stand for the standard RGB color spaces. Here, the effect of the color matching processing is assumed to be negligible for the purpose of simplifying the explanation. In other words, the RGB values expressed on the application 202 are assumed to coincide with the RGB values of the pixels included in the print data created by the rendering engine of either the printer driver 203 or the OS printing system. Thus, the print data having the values R=255 (0xFF), G=0 (0x00), and B=255 (0xFF) becomes the data to be printed in the fluorescent pink spot color in the case where the spot color printing is designated by using the peripheral device 102. Moreover, the following description will be given on the assumption that the RGB values of other image objects displayed in the image data editing region 302 have the RGB values other than the aforementioned values.

The image data displayed in the image data editing region 302 is printed in the case where the user presses the print button 309. The poster data creation application is terminated in the case where the user presses the end button 310.

Back to FIG. 2, upon receipt of the print request from the user, the application 202 (the poster data creation application 311) issues the print instruction to the OS 201. Upon receipt of the print instruction, the OS 201 assigns subsequent processing concerning the printing to the OS printing system (not shown) which is provided to the OS 201. Here, the OS printing system performs operations in cooperation with the printer driver 203.

FIG. 4 is a diagram showing a print setting dialogue 400 in the present embodiment. Upon receipt of the print instruction from the application 202 through the OS printing system, the printer driver 203 causes the user interface unit 204 to display the print setting dialogue 400. The user can obtain a desired print product from the peripheral device 102 by conducting a variety of the print setting on the print setting dialogue 400.

The print setting dialogue 400 includes a printer setting item 401, a number of copies setting item 402, a printed pages setting item 403, control items 404, a paper size setting item 405, a paper type setting item 406, a print quality setting item 407, and a feeding mode setting item 408. Moreover, the print setting dialogue 400 includes a fluorescent pink spot color print setting item 409, an orange spot color print setting item 410, a print preview setting item 411, a cancel button 412, and a print button 413.

The printer setting item 401 is used to select a print cue for the peripheral device 102 from a list registered with the OS printing system in advance. The number of copies setting item 402 is used for setting the number of copies to be printed. The printed pages setting item 403 enables selection for printing all pages or printing pages in a designated range by using radio buttons. In the case of selection for printing the pages in the designated range, the range of the pages to be printed can be designated by using the control items 404. The paper size setting item 405 enables selection of the paper size such as A1 and A2 from a list to be printed with the peripheral device 102, and outer lengths of the selected paper size are displayed at the same time. The paper type setting item 406 enables selection of one of the types of the paper such as plain paper and glossy paper from a list, which are acceptable to the peripheral device 102.

The print quality setting item 407 enables selection of print quality such as fast, standard, and high modes from a list, which is to be used for printing with the peripheral device 102. Meanwhile, in the present embodiment, values to be set in the print quality setting item 407 are assumed to correspond to printing resolutions in the case of printing with the peripheral device 102. As for the printing resolutions, the fast mode is assumed to correspond to 300 dpi, the standard mode is assumed to correspond to 600 dpi, and the high mode is assumed to correspond to 600 dpi, respectively.

The feeding mode setting item 408 enables selection of a feeding mode such as rolled paper and cut paper from a list, which is to be fed in the peripheral device 102. The print setting dialogue 400 is provided with the fluorescent pink spot color print setting item 409 and the orange spot color print setting item 410 as the selectable items. The fluorescent pink spot color print setting item 409 is an item for accepting the selection as to whether or not it is appropriate to activate the spot color printing (fluorescent pink spot color printing) for printing the pixels having the RGB values corresponding to fluorescent pink in fluorescent pink. Here, in the case where the fluorescent pink spot color printing is not activated, the pixels having the RGB values corresponding to fluorescent pink are printed in a color other than fluorescent pink. In the case where a check box for the fluorescent pink spot color print setting item 409 is on and there are the pixels having the RGB values corresponding to fluorescent pink among the pixels included in the print data created by the printer driver 203, the pixels are printed by using a fluorescent pink spot color ink. In the case where the check box is off, the fluorescent pink spot color ink (a color material) is not used even if there are the pixels having the RGB values corresponding to fluorescent pink among the pixels included in the print data created by the printer driver 203. In this case, the image representing the RGB values is formed by using the process color inks of CMYK and the like.

Likewise, the orange spot color print setting item 410 is an item for accepting the selection as to whether or not it is appropriate to activate the spot color printing (orange spot color printing) for printing the pixels having the RGB values corresponding to orange in orange. Here, as with fluorescent pink, in the case where the orange spot color printing is not activated, the pixels having the RGB values corresponding to orange are printed in a color other than orange. In the case where a check box for the orange spot color print setting item 410 is on and there are the pixels having the RGB values corresponding to orange in the print data created by the printer driver 203, the pixels are printed by using an orange spot color ink by the peripheral device 102. In the case where the check box is off, the orange spot color ink is not used even if there are the pixels having the RGB values corresponding to orange in the print data created by the printer driver 203. In this case, the image representing the RGB values is formed by using the process color inks of CMYK and the like. The description has been given above on the assumption that only fluorescent pink and orange can be set to the spot colors used in the spot color printing. However, the present invention is not limited only to this configuration. In another configuration, the number of the spot colors may be set to a desired number other than two.

Note that the setting concerning the spot color is not limited only to the above-described method. For example, the peripheral device 102 first displays an item on the printer driver 203 for accepting the setting as to whether or not it is appropriate to activate the spot color printing. Then, any of the above-described print setting items 409 and 410 may accept the setting as to whether or not it is appropriate to activate the spot color printing of the corresponding color in the case where the setting for executing the spot color printing is accepted as a consequence of an operation involving the relevant item.

The print preview application 206 is activated in the case where a check box for the print preview setting item 411 is on and the print button 413 is selected. The cancel button 412 is selected in the case of returning to the state before the display of this print setting dialog without carrying out the printing. In the case where the print button 413 is selected in an off state of the print preview setting item 411, the print data to be printed on the application 202 and print setting values set by using this print setting dialog are delivered to the graphics processing unit 205 through the OS printing system. In the case where the print button 413 is pressed in the conditions according to the respective control items shown in print setting dialogue 400, a spool PDF file shown in FIG. 5A to be described later and a print setting ticket shown in FIG. 6 to be described later are transmitted to either the graphics processing unit 205 or the print preview control unit 208.

The print preview application 206 includes the print preview display unit 207 and the print preview control unit 208. The print preview application 206 obtains the spool PDF file and the print setting ticket through the OS printing system at the time of activation. In the present embodiment, the print preview control unit 208 of the print preview application 206 obtains the spool PDF file shown in FIG. 5A and the print setting ticket shown in FIG. 6 from the OS printing system at the time of activation.

Figures 5A, 5B:
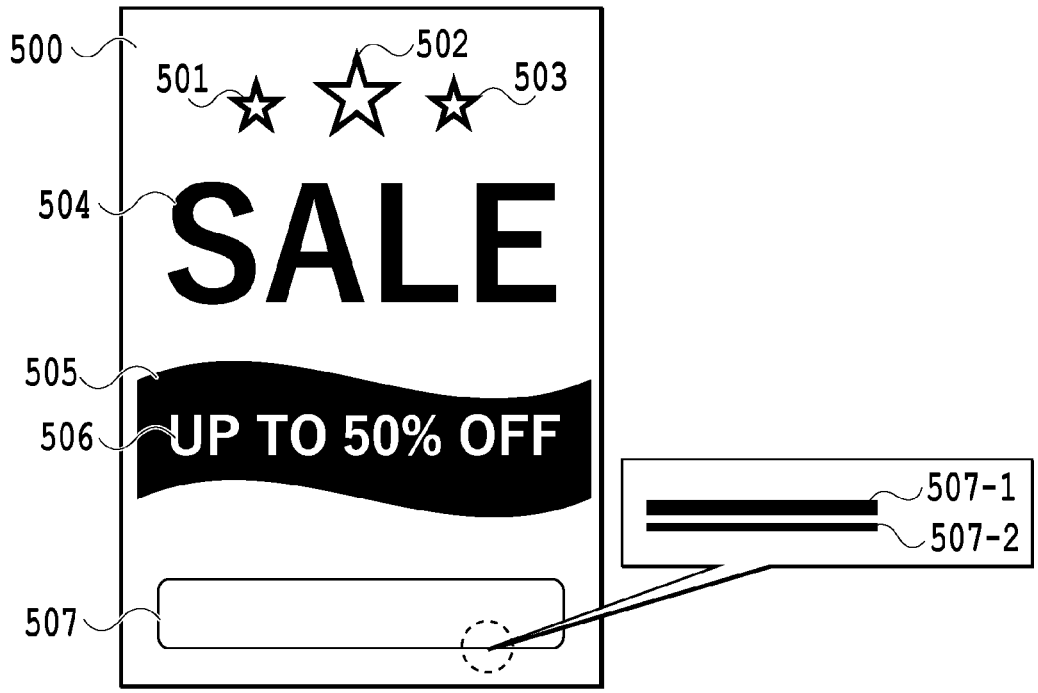
FIG. 5A is a diagram showing a drawing object.
FIG. 5B is a table showing colors designated for drawing and colors of lines.

FIG. 5A is a diagram schematically showing respective drawing objects included in the spool PDF file, and FIG. 5B is a table showing fill colors and line colors designated for drawing the respective drawing objects. The drawing objects in FIG. 5A include two types of drawing objects, namely, graphic objects and text objects. Each graphic object includes drawing commands for lines and filling, and colors are designated as a line color and a fill color, respectively. Each text object includes a drawing command for a text, and a color of the text is designated as a fill color. FIG. 5B shows the fill colors and the line colors of the respective drawing objects as mentioned above. The leftmost column in FIG. 5B corresponds to the codes of the objects in FIG. 5A.

Regarding a graphic object 500 that corresponds to a background, a color having the values R=0 (0x00), G=255 (0xFF), and B=80 (0x50) is designated for the fill color and the line color. Regarding each of graphic objects 501, 502, and 503, a color having the values R=0 (0x00), G=0 (0x00), and B=0 (0x00) is designated for the line color and a color having the values R=255 (0xFF), G=255 (0xFF), and B=0 (0x00) is designated for the fill color. Regarding a text object 504, a text stating "SALE" is designated by a color having the values R=255 (0xFF), G=0 (0x00), and B=255 (0xFF). Regarding a graphic object 505, a color having the values R=255 (0xFF), G=0 (0x00), and B=0 (0x00) is designated for the fill color and the line color.

Regarding a text object 506, a text stating "UP TO 50% OFF" in front of the graphic object 505 is designated by a color having the values R=255 (0xFF), G=255 (0xFF), and B=255 (0xFF). A graphic object 507 is a graphic object corresponding to an object 327 drawn by the application. Meanwhile, the graphic object 507 is an object formed from two closed paths, which are a graphic object 507-1 and a graphic object 507-2 arranged from inside to outside of the graphic object 507. The fill colors set to the respective drawing objects in the PDF file, the line colors and line widths designated for the graphic objects, and the sizes in the case of drawing the text objects are as shown in the table of FIG. 5B. Meanwhile, a width of 420.0 mm and a height of 594.0 mm, which are the same as the dimensions of an A2 size sheet set to the paper size setting item 405, are assumed to be set to Media Box that corresponds to an external size of the sheet in this spool PDF file.

FIG. 6 is a diagram schematically showing a print setting ticket 600. Regarding the print setting ticket 600, the values set in the print setting dialogue 400 are created as the print setting ticket. In the print setting ticket 600, a printer setting item 601 corresponds to the printer setting item 401 and indicates that a print cue name "Large Format Pinter" is set as an output destination. A number of copies item 602 corresponds to the number of copies setting item 402 and indicates the setting to print one copy. A printed pages setting item 603 corresponds to the printed pages setting item 403 and indicates page 1 as a start page and page 1 as an end page. A paper type setting item 604 corresponds to the paper type setting item 406 and indicates the setting of coated paper. A print quality setting item 605 corresponds to the print quality setting item 407 and indicates the setting of the printing resolution to 600 dpi.

A feeding mode setting item 606 corresponds to the feeding mode setting item 408 and indicates the setting to feed the rolled paper. Paper size setting items 607 correspond to the paper size setting item 405 and indicate the settings of A2 as the name of the paper size, the width and the height of the paper, and upper, lower, right, and left margins in the order of 0.01 mm, respectively. A fluorescent pink spot color print setting item 608 corresponds to the fluorescent pink spot color print setting item 409 and indicates the setting of the fluorescent pink spot color printing. An orange spot color print setting item 609 corresponds to the orange spot color print setting item 410 and indicates non-setting of the orange spot color printing.

A print preview setting item 610 corresponds to the print preview setting item 411 and indicates the setting to activate the print preview application 206. A spool file format item 611 represents a set value indicating a spool file format drawn by the application, which indicates that the spool file is the PDF file in this case. The present embodiment will describe a PDF file of a vector mode as an example of the data format of the spool file. However, in the case where a JPEG file of a raster mode is drawn as the spool file by the application, for example, a value such as "image/jpeg" is stored in this setting item.

Figure 7A:
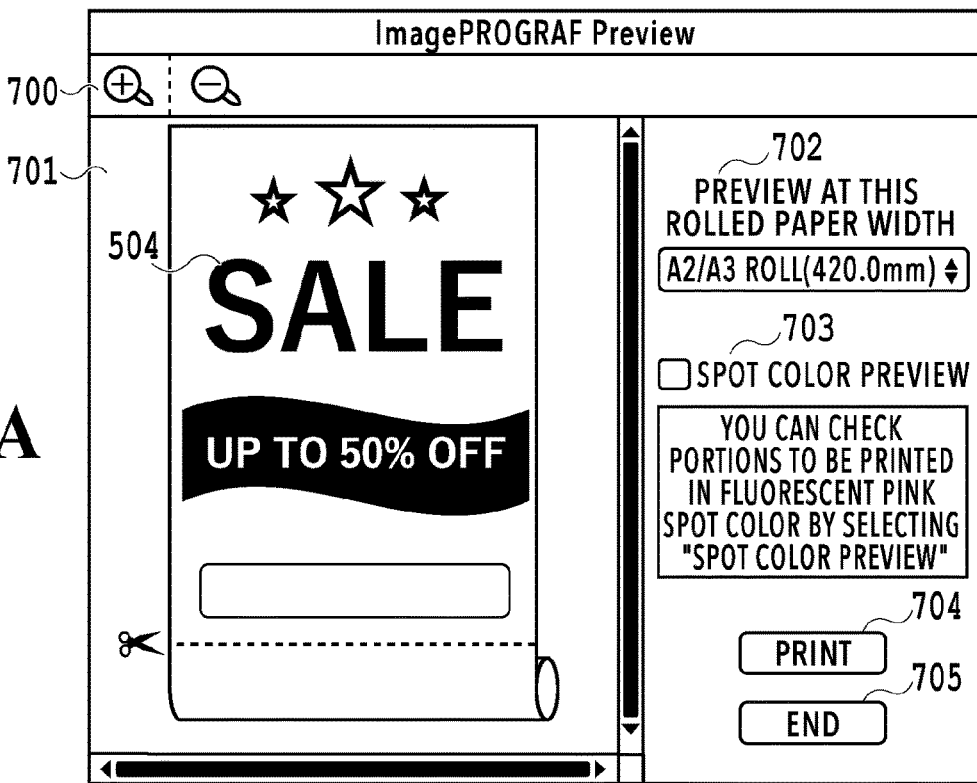
FIG. 7A is an example of a preview image displayed on a print preview display unit.
Figure 7B:
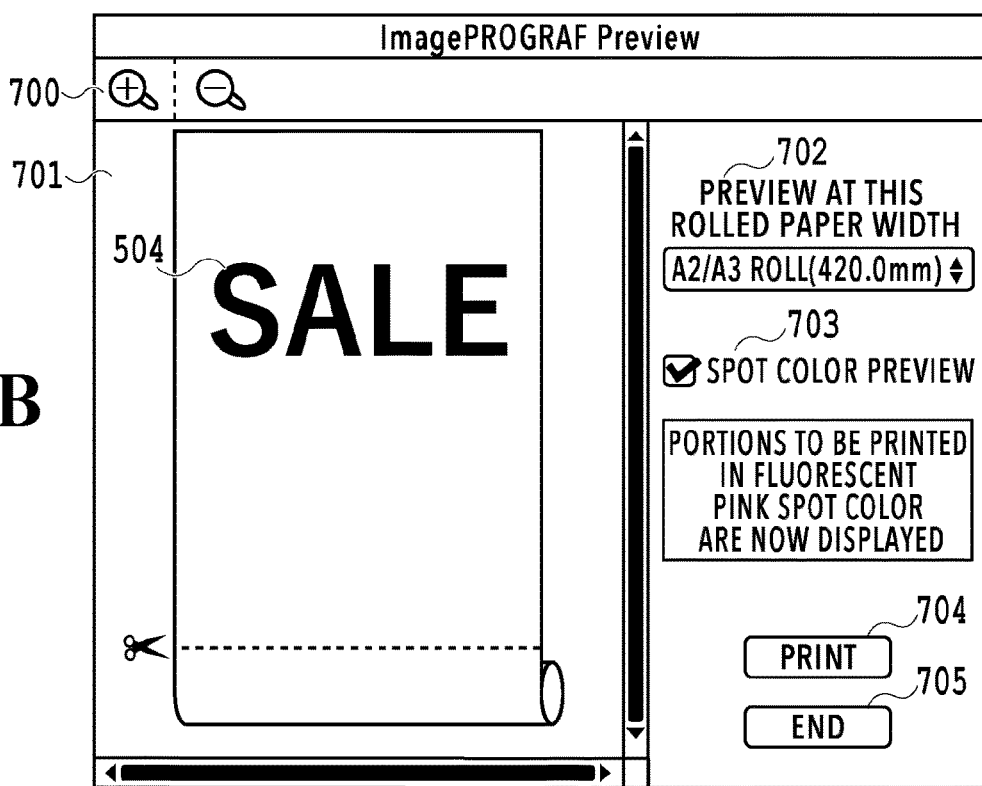
FIG. 7B is another example of the preview image displayed on the print preview display unit.

FIG. 7A is an example of a preview image displayed on the print preview display unit 207. FIG. 7B is an example of a spot color preview image in a typical preview image. Toolbar buttons 700 are used for changing a display magnification. A printed image is displayed together with a printing layout in a print preview image display region 701. A preview rolled paper width setting item 702 is a control item that includes a list of rolled paper widths that can be fed to the peripheral device 102. Regarding a rolled paper width to be set in the preview rolled paper width setting item 702, the print preview control unit 208 may obtain the rolled paper width currently fed to the peripheral device 102 and the relevant rolled paper width may be selected. Alternatively, the user may select an arbitrary rolled paper width from the list. The rolled paper width selected in the preview rolled paper width setting item 702 is reflected to a printing layout image displayed in the print preview image display region 701.

In the case where a check box for a spot color preview setting item 703 is on, only a data area for which the peripheral device 102 uses the spot color ink is displayed in the print preview image display region 701. Meanwhile, the spot color preview setting item 703 is a control item which is displayed only in the case where the spot color printing is activated in the print setting. The user selects a print button 704 in the case where the user learns that a desired result is available as a result of the preview. The user selects an end button 705 in the case where the user learns that the desired result is not available as a result of the preview. In the case where this button is selected, the preview application is terminated without carrying out the printing.

FIG. 7B shows the typical preview image display in the case of setting the spot color printing. Here, it is possible to check a text object set to use the spot color ink without scrolling the preview image. However, it is not possible to check all the objects set to use the spot color ink. Specifically, large size print data has a large data size and if the spot color printing is set to thin lines included in the print data, such thin lines are not displayed on the print preview displayed in a size for checking a printing layout due to a low resolution. For this reason, it is not possible to check the thin lines set to the spot color. Then, if the thin lines included in the print data are printed by using the spot color, these lines may generally give an odd impression in terms of harmony with surrounding images, thus resulting in a printing failure.

Now, it is assumed that part of the image data included in the poster data created by a third party is unintentionally created by using the color corresponding to the spot color printing and that the user who is going to print this data checks the spot color preview display shown in FIG. 7B. Concerning the objects other than the thin lines which the user edited and set to apply the spot color printing by oneself, the user can easily check from the spot color preview as to which part of the print data uses the spot color ink. However, in the case where the RGB values that use the spot color ink are resultantly set to an object drawn with thin lines in the image data created by the third party, such thin lines are not displayed in the course of checking the spot color preview display in FIG. 7B. Accordingly, the user will recognize that the spot color ink is not used for the thin lines. As a consequence, if the user carries out the printing in this state, these lines give an odd impression in terms of harmony with surrounding images, thus resulting in a printing failure.

Given the circumstances, in the present embodiment, the smallest object is extracted from the objects set to use the spot color ink, and then a minimum resolution that enables the preview display of the extracted object is calculated. In this way, the spot color preview display can display all the objects set to use the spot color ink. A description will be given below of this method.

Figure 8:
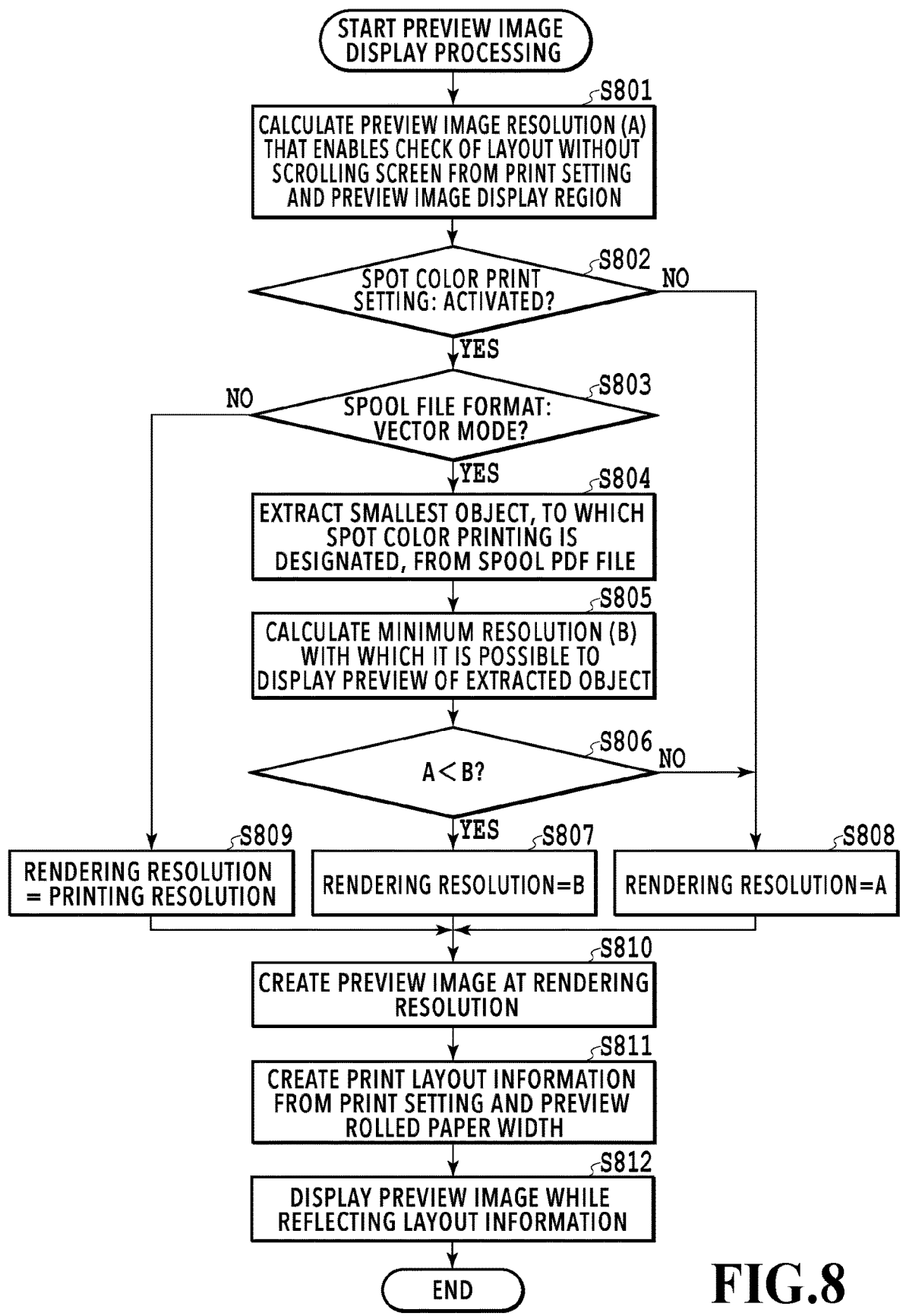
FIG. 8 is a flowchart of preview image display processing.

FIG. 8 is a flowchart of preview image display processing to be executed by the print preview control unit 208. The print preview control unit 208 executes the preview image display processing shown in FIG. 8 in the case where the print preview control unit 208 obtains the spool PDF file and the print setting ticket from the OS printing system.

Here, the series of processing shown in FIG. 8 is carried out by causing the CPU 111 of the host computer 101 (the information processing apparatus 101) to load program codes stored in the ROM 112 into the external storage device 114 and to execute the program codes. Alternatively, part or all of the functions of the steps in FIG. 8 may be realized by hardware such as an ASIC and an electronic circuit.

In the case where the preview image display processing is started, the print preview control unit 208 calculates a resolution (A) in S801 by the control of the CPU 111. Here, the resolution (A) is a resolution of the preview image with which it is possible to check the layout without scrolling the preview image, which is calculated from the obtained print setting ticket and a region to display the preview image. This corresponds to calculation of a preview resolution for displaying the print preview of the entirety of one page suitable for checking the layout. For example, the print preview application 206 is assumed to display the preview image in a region of the display unit 119 having a width of 468 pixels and a height of 662 pixels. In this case, a maximum resolution is obtained in such a way that an image obtained by rendering the spool PDF file into a size of the print setting values of the width of 420.0 mm and the height of 594.0 mm with upper, lower, right, and left margins of 3.0 mm each as indicated in the items 607 in the print setting ticket fits into the region having the width of 468 pixels and the height of 662 pixels. In this case, the resolution calculated in terms of the lateral direction turns out to be 25.4/420.0×468=28.302 (dpi) while the resolution calculated in terms of the longitudinal direction turns out to be 25.4/594.0×662=28.307 (dpi). Here, the smaller resolution 28.302 (dpi) is calculated as the resolution (A).

Thereafter, the print preview control unit 208 determines whether or not the spot color print setting is activated in S802 by the control of the CPU 111. The processing goes to S808 in the case where the spot color print setting is determined to be not activated in S802, in order to determine the resolution (A) calculated in S801 as a rendering resolution. Then, the processing goes to S810. The processing goes to S803 in the case where the fluorescent pink spot color print setting item 608 is activated and the spot color print setting is therefore determined to be activated in S802.

The print preview control unit 208 determines whether or not the spool file format is the data format of the vector mode in S803 by the control of the CPU 111. The processing goes to S804 in the case where the spool file format is of the vector mode, or goes to S809 in the case where the spool file format is of a raster data format and the like. In the case where the processing goes to S809, the print preview control unit 208 determines the printing resolution obtained from the print setting ticket as the rendering resolution by the control of the CPU 111 because the image created by using the raster mode is not compatible with variable resolutions. Then, the processing goes to S810.

In the case where the processing goes from S803 to S804, the print preview control unit 208 extracts the smallest object, to which the spot color printing is designated, from the spool PDF file by the control of the CPU 111. In this case, the fluorescent pink spot color printing is activated, and the smallest object to which the RGB values of R=255 (0xFF), G=0 (0x00), and B=255 (0xFF) corresponding to the fluorescent pink spot color setting are set as the color is extracted. In the case where the objects subjected to the spot color setting in FIG. 5B are the text object 504 and the graphic object 507-2, the graphic object 507-2 being the smaller object is extracted.

Thereafter, the print preview control unit 208 calculates the minimum resolution (B) with which it is possible to display the preview of the extracted smallest object for the spot color printing in S805 by the control of the CPU 111. In the case where the graphic object 507-2 is extracted, for example, the minimum resolution (B) with which it is possible to display the preview of the graphic object 507-2 having the line width of the 1.0 pt is calculated. The unit pt is equivalent to a size obtained by dividing 1 inch by 72. Accordingly, the resolution (B) is calculated as 72/1.0=72 (dpi) in this case.

Here, the resolution to be displayed in a region corresponding to 1 pixel in the display unit 119 will be defined as the minimum resolution. However, in the case where it is difficult to identify display of the region of 1 pixel such as in a case of using a high-resolution display unit, the minimum resolution may be changed to an arbitrary value such as a region for 2 pixels.

Then, in S806, the print preview control unit 208 compares the resolution (A) calculated in S801 with the resolution (B) calculated in S805 by the control of the CPU 111. In the case where the resolution (A) calculated in S801 is higher, the processing goes to S808 to set the rendering resolution to the resolution (A) calculated in S801. Then, the processing goes to S810. In the case where the resolution (A) calculated in S801 is not higher than the resolution (B) calculated in S805, the processing goes to S807 to set the rendering resolution to the resolution (B) calculated in S805. Then, the processing goes to S810. For instance, in the above-described example where the resolution (A) is equal to 28.3028 (dpi) and the resolution (B) is equal to 72 (dpi), the value 72 (dpi) representing the resolution (B) calculated in S805 is higher. Accordingly, the processing goes to S807 and the resolution (B) calculated in S805 is set to the rendering resolution.

The print preview control unit 208 creates the preview image at the rendering resolution determined in the processing so far in S810 by the control of the CPU 111. Thereafter, the print preview control unit 208 creates the printing layout information while reflecting the print setting and a preview rolled paper width in S811 by the control of the CPU 111. Here, the print preview control unit 208 obtains a width of the currently fed rolled paper from the peripheral device 102 as the preview rolled paper width. In this case, an A2/A3 roll (420.0 mm) having the rolled paper width of 420.0 mm is assumed to be obtained from the peripheral device 102. If it is not possible to obtain the rolled paper width, then a predetermined default rolled paper width may be reflected. The printing layout information in the case of printing the A2 size (the external dimensions of 420.0×594.0 mm, with the upper, lower, right, and left margins of 3.0 mm each), which is indicated in the paper size setting items 607 in the print setting ticket, on the rolled paper having the width of 420.0 mm obtained as the preview rolled paper width is created, for example.

Subsequently, the print preview control unit 208 displays the print preview image in S812 by the control of the CPU 111 while using the print preview image and the printing layout information created by the print preview control unit 208. Then, the processing is terminated.

Figure 9:
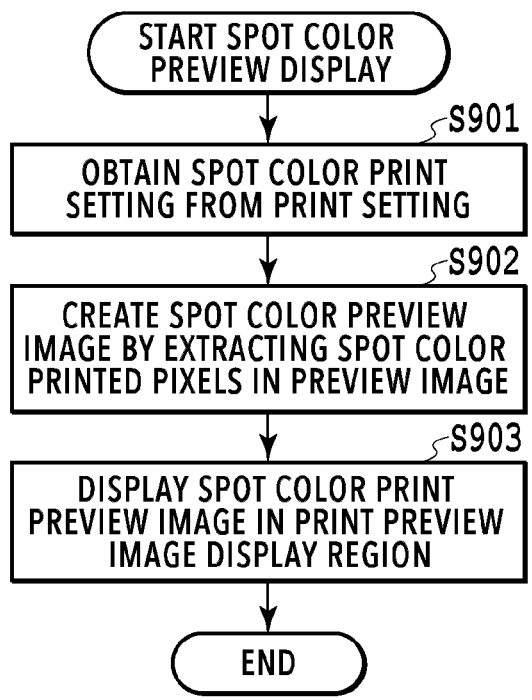
FIG. 9 is a flowchart showing spot color preview display processing.

FIG. 9 is a flowchart showing spot color preview display processing to be executed by the print preview control unit 208 in the case where the spot color preview setting item 703 is on. Here, the series of processing shown in FIG. 9 is carried out in parallel with the series of processing shown in FIG. 8. Moreover, the series of processing shown in FIG. 9 is carried out by causing the CPU 111 of the host computer 101 to load program codes stored in the ROM 112 into the external storage device 114 and to execute the program codes. Alternatively, part or all of the functions of the steps in FIG. 9 may be realized by the hardware such as the ASIC and the electronic circuit.

In the case where the spot color preview display processing is started, the print preview control unit 208 obtains the spot color print setting from the print setting in S901 by the control of the CPU 111. Here, the print preview control unit 208 obtains the value of the fluorescent pink spot color print setting item 608 and the value of the orange spot color print setting item 609 in the print setting ticket, thus obtaining the fact that the fluorescent pink spot color printing is set active (on) (see FIG. 6). Thereafter, the print preview control unit 208 creates a spot color preview image in S902 by the control of the CPU 111 while extracting spot color printed pixels in the preview image created in S810.

Here, the pixels having the RGB values of R=255 (0xFF), G=0 (0x00), and B=255 (0xFF) corresponding to the fluorescent pink spot color printing are extracted from the preview image created in S810. Thereafter, an image is created by setting the RGB values of the pixels other than the extracted pixels to R=255 (0xFF), G=255 (0xFF), and B=255 (0xFF) that represent white. As a consequence of this processing, the spot color preview image (a special printing portion check preview image) is created which represents the printed pixels that use the fluorescent pink spot color ink. On the other hand, in the case where the orange spot color print setting value is set active in S901, an image is created in accordance with the same processing by replacing the RGB values of the pixels other than the pixels having the RGB values corresponding to the orange spot color printing with the RGB values that represent white. In this way, the preview image of the orange spot color is created.

Thereafter, in S903, the print preview control unit 208 changes the preview image displayed in S812 by the control of the CPU 111. Specifically, the created spot color print preview image is displayed in a print preview image display region 801 by using the print preview display unit 207.

Figure 10:
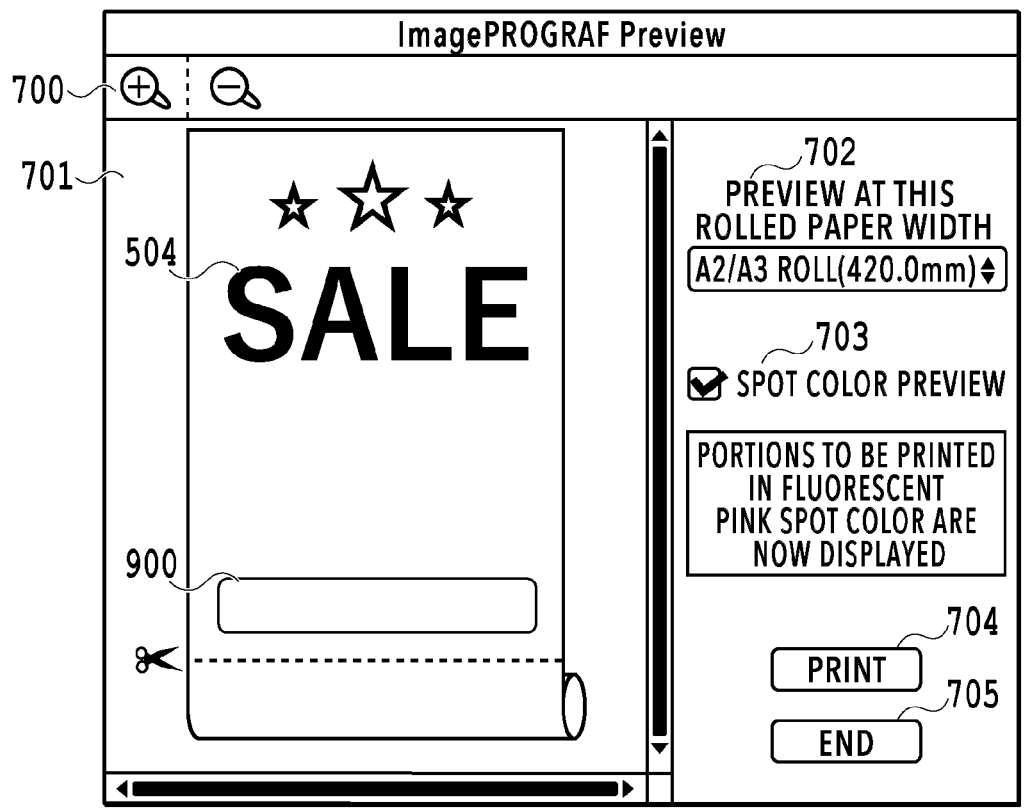
FIG. 10 is a diagram showing an example of preview display created at a resolution (A)

FIG. 10 is a diagram showing an example of the preview display created at the resolution (A) calculated in S801, which is the example of the preview display to be displayed in the case where the preview image is created by way of S806 to S808. Since the preview image is created at the resolution (A) in FIG. 10, it is possible to check the entire printing layout without scrolling the screen. Meanwhile, since the result of determination of the comparison between the resolutions based on the premise of the resolution (A)<the resolution (B) in S806 turns out to be no, an object 900 being an object formed from thin lines is displayed even in the case of creation at the resolution (A), and all the objects set to the spot color are displayed therein. Therefore, the user can check from the preview display that the text object 504 and the object 900 are the objects set to the spot color.

Figure 11A:
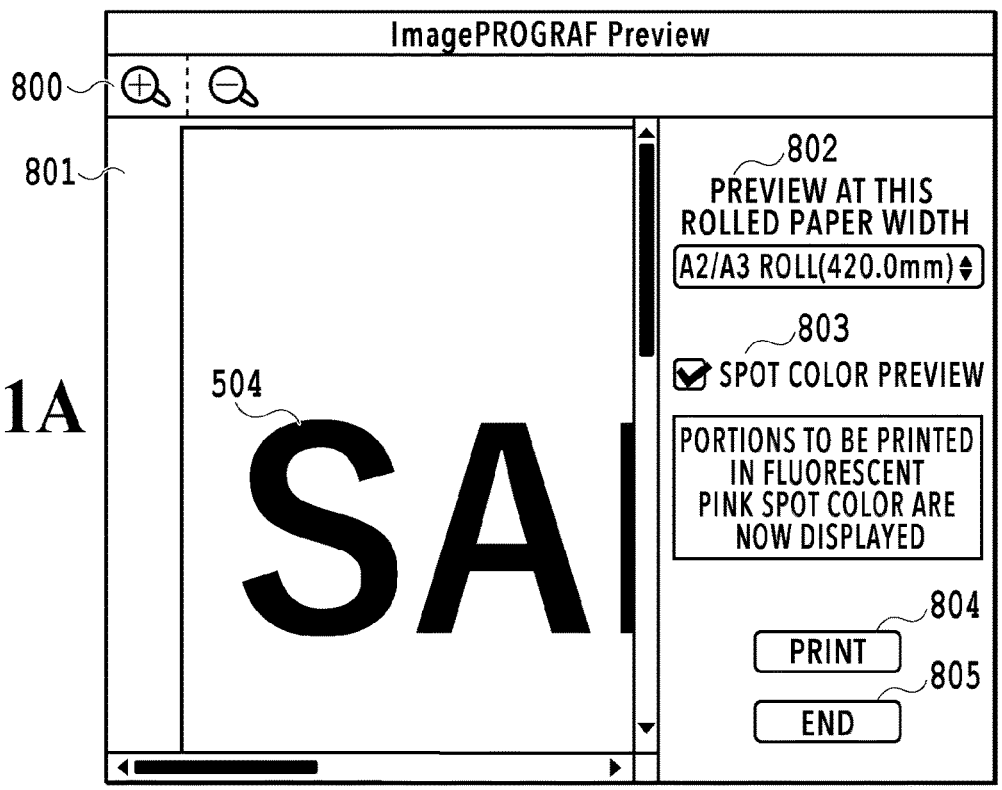
FIG. 11A is a diagram showing an example of preview display created at a resolution (B)
Figure 11B:
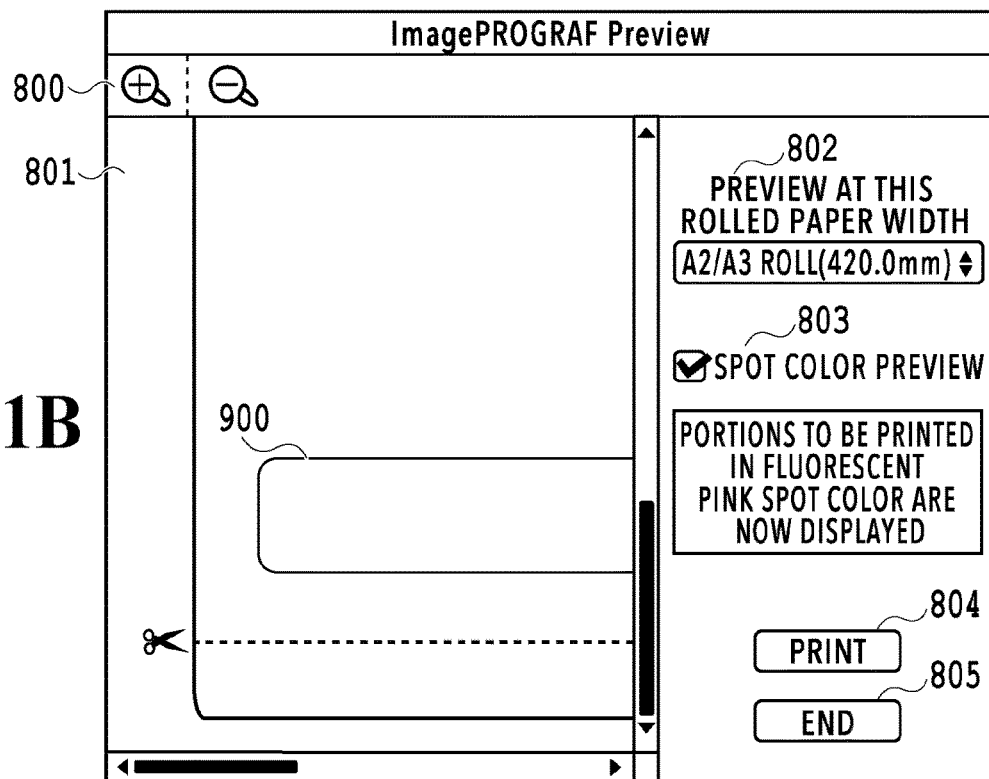
FIG. 11B is a diagram showing another example of the preview display created at the resolution (B)

FIGS. 11A and 11B are diagrams showing examples of the preview display created at the resolution (B) calculated in S805. The rendering resolution becomes the resolution (B) in the case where the spot color printing is set, and the preview image of the text object 504 set to use the spot color ink and created at the resolution (B) is displayed. A preview display screen in FIG. 11A does not display the entirety of one page of the print preview. For this reason, it is necessary to scroll the screen in order to check the entire printing layout. The user can check the entire printing layout by scrolling the screen in the lateral direction or the downward direction.

By scrolling the preview image display to a bottom end, the thin-line object 900 that is the preview image at the bottom end of the print data is displayed as shown in FIG. 11B. From this print preview display, the user can learn at what position on the rolled paper and how the object data will be printed, which the user intends to print by using the application and which is set to use the spot color ink. Thus, it is possible to suppress a printing failure.

Figure 12:
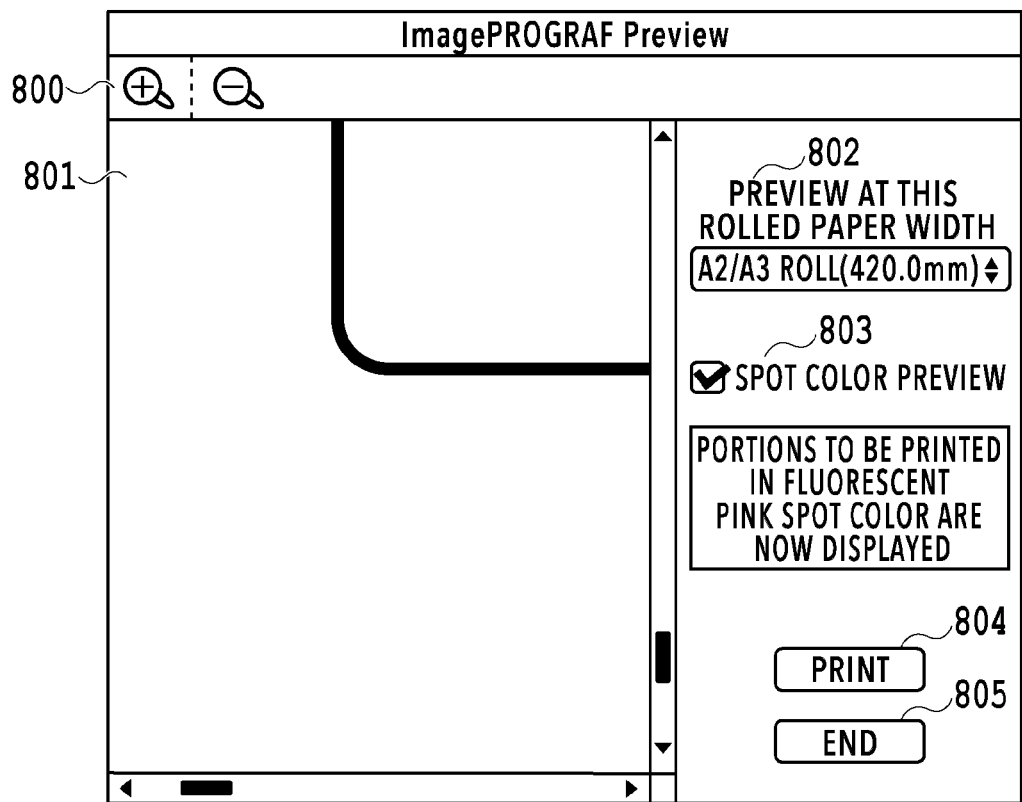
FIG. 12 is a diagram showing an example of preview display at a printing resolution.

FIG. 12 is a diagram showing an example of the preview display in the case where the rendering resolution becomes a printing resolution (600 dpi). This is the example of the preview image display in the case where the spool file format is not of the vector mode in S803 of FIG. 8. In general, the print data is thought to be drawn at the printing resolution (600 dpi) as shown in the preview display in FIG. 12 even in the case of checking the spot color printing portion as the image. In FIG. 12, all the objects set to the spot color can be checked by scrolling. However, the preview image is displayed at a higher resolution than what is required. For this reason, it is necessary to carry out more scrolling operations than those in the case of the screens shown in FIGS. 11A and 11B in order to check the entire print data.

According to the present embodiment, it is possible to check all the objects that are set to the spot color. Thus, the user can determine whether or not it is appropriate to conduct the spot color printing while including the thin-line object.

As described above, the resolution for checking the printing layout and the resolution for the spot color printing are obtained and then the preview image is displayed by using the resolution based on the resolution for checking the printing layout and the resolution for the spot color printing. Thus, it is possible to realize a print control apparatus, a printing control method, and a storage medium, which can suppress the occurrence of an unintended printing result.

Second Embodiment

A second embodiment of the present invention will be described below with reference to the drawings. Note that the basic configuration of the present embodiment is the same as the configuration of the first embodiment. Accordingly, characteristic structures of the present embodiment will be described below. The present embodiment will describe a configuration of a print preview system that does not require a scrolling operation at the time of checking a layout.

Figure 13:
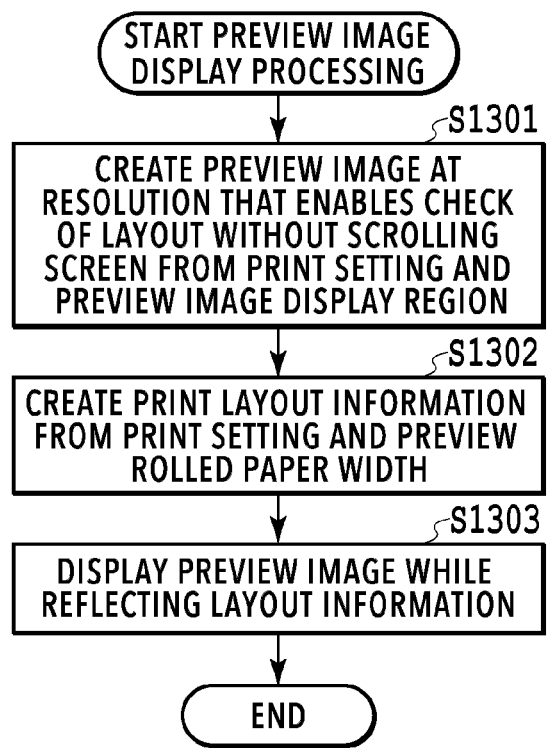
FIG. 13 is a flowchart showing preview image display processing.

FIG. 13 is a flowchart showing preview image display processing in the present embodiment. Here, the series of processing shown in FIG. 13 is carried out by causing the CPU 111 of the host computer 101 to load program codes stored in the ROM 112 into the external storage device 114 and to execute the program codes. Alternatively, part or all of the functions of the steps in FIG. 13 may be realized by the hardware such as the ASIC and the electronic circuit.

In the case where the preview image display processing is started, the print preview control unit 208 calculates the resolution in S1301 as with S801 in FIG. 8 by the control of the CPU 111, and creates the preview image at a preview image resolution thus calculated. This preview image is formed into the preview image that displays the entirety of one page without scrolling. Thereafter, the processing goes to S1303 via S1302. Here, the processing in S1302 and S1303 is the same as the processing in S811 and S812 in FIG. 8 and the description will be omitted herein.

Figure 14:
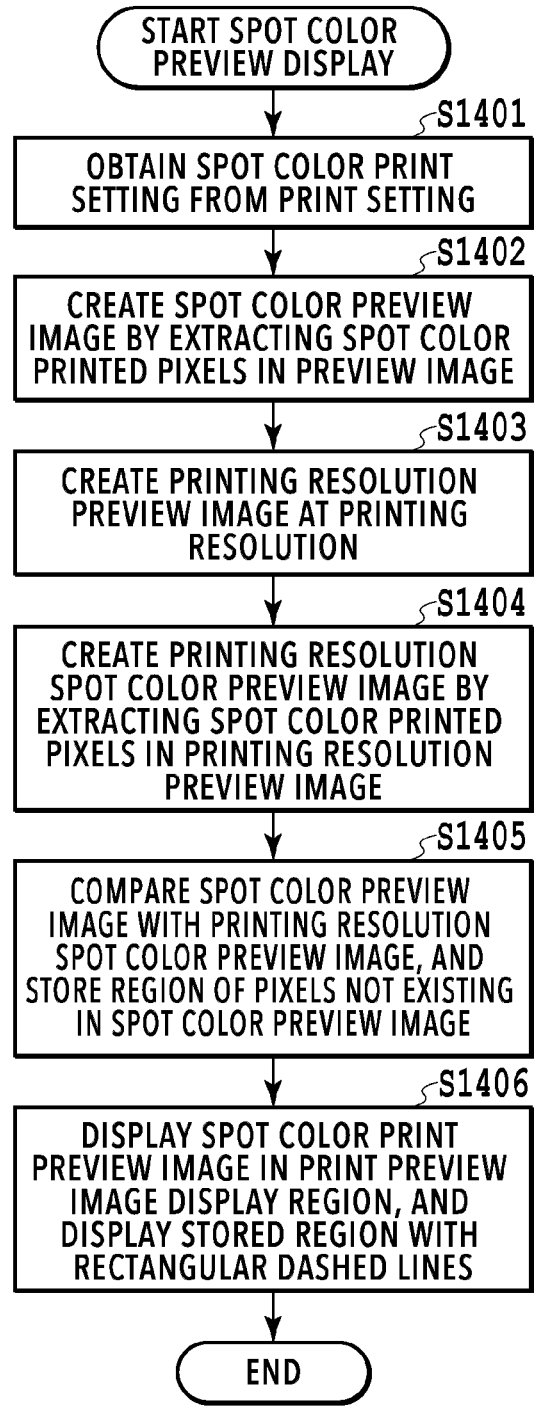
FIG. 14 is a flowchart showing spot color preview display processing.

FIG. 14 is a flowchart showing spot color preview display processing in the case where a spot color preview setting item 803 is on. Here, the series of processing shown in FIG. 14 is carried out after the series of processing shown in FIG. 13. Moreover, the series of processing shown in FIG. 14 is carried out by causing the CPU 111 of the host computer 101 to load program codes stored in the ROM 112 into the external storage device 114 and to execute the program codes. Alternatively, part or all of the functions of the steps in FIG. 14 may be realized by the hardware such as the ASIC and the electronic circuit.

In the case where the spot color preview display processing is started, the print preview control unit 208 obtains the spot color print setting from the print setting in S1401 by the control of the CPU 111. Then, the print preview control unit 208 creates the spot color preview image in S1402 by the control of the CPU 111 while extracting the spot color printed pixels in the preview image created in S1301 in FIG. 13.

Thereafter, the print preview control unit 208 creates a printing resolution preview image at the printing resolution in S1403 by the control of the CPU 111. In this case, the print preview control unit 208 obtains the value 600 dpi from the print quality setting item 605 (see FIG. 6) in the print setting ticket, and creates a printing resolution image by rendering the spool PDF file at 600 dpi. Thereafter, in S1404, the print preview control unit 208 carries out the same processing as S1402 on the printing resolution image created in S1403 by the control of the CPU 111. Here, all the objects set to the spot color are displayed since the preview image is created at the printing resolution (600 dpi). Then, the print preview control unit 208 compares the image created in S1402 with the image created in S1404 (preview image comparison) in S1405 by the control of the CPU 111. Moreover, the print preview control unit 208 stores a region of an object that does not exist in the spot color preview image created in S1402, which is a difference obtained as a result of the comparison, as a rectangular region.

FIG. 15 is a diagram showing a storage format of the region of the pixels to be stored in S1405. A displayed position and a size of the rectangle in the spot color preview image are stored in S1405. In FIG. 15, "No." represents an identifier of the region, "Origin X", and "Origin Y" represent a coordinate value in x direction and a coordinate value in y direction to start display in the case of defining the top left end as the origin, and "Width" and "Height" represent a width and a height of the rectangle expressed by using the unit pix.

Back to the flowchart in FIG. 14, subsequently in S1406, the print preview control unit 208 carries out display processing, which is the same as S903 in FIG. 9, by the control of the CPU 111. In this instance, the rectangular region of the stored object is displayed by using a dashed line.

Figure 16:
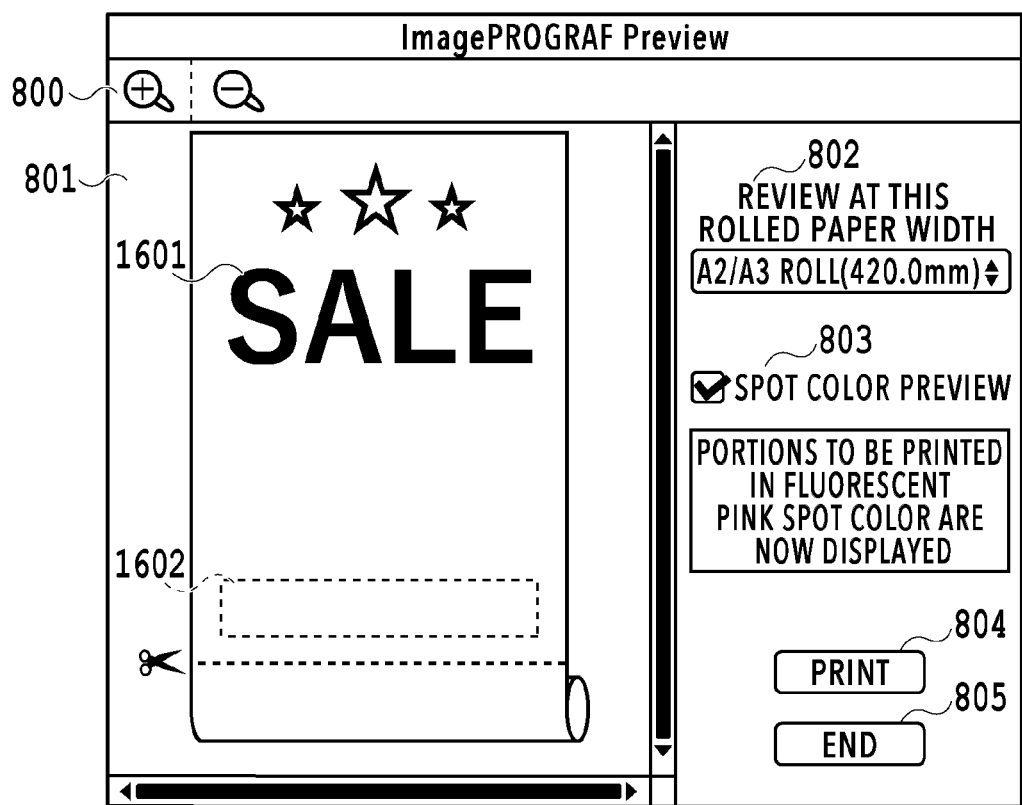
FIG. 16 is a diagram showing a spot color preview image.

FIG. 16 is a diagram showing the spot color preview image displayed in S1406. Here, an object 1602 indicates a region of the object designated to be printed in the spot color, which cannot be displayed at the resolution that enables checking of the layout without scrolling the screen, by using the rectangular dashed line. The display using the dashed line can notify the user of the existence of the object designated to be printed in the spot color at the position of the object 1602.

The present embodiment provides the print preview with which it is possible to check at which place in the print data the spot color ink is used even in the case where the spot color printing is set to a small object such as a thin line. Meanwhile, the user can check the place where the spot color ink is used without carrying out a scrolling operation.

Third Embodiment

A third embodiment of the present invention will be described below with reference to the drawings. Note that the basic configuration of the present embodiment is the same as the configuration of the first embodiment. Accordingly, characteristic structures of the present embodiment will be described below. The present embodiment will describe a configuration to issue a warning (a notification) from preview display in a case of issuing a print instruction in a state where there is a spot color printing portion that is not checked by the user.

Figure 17:
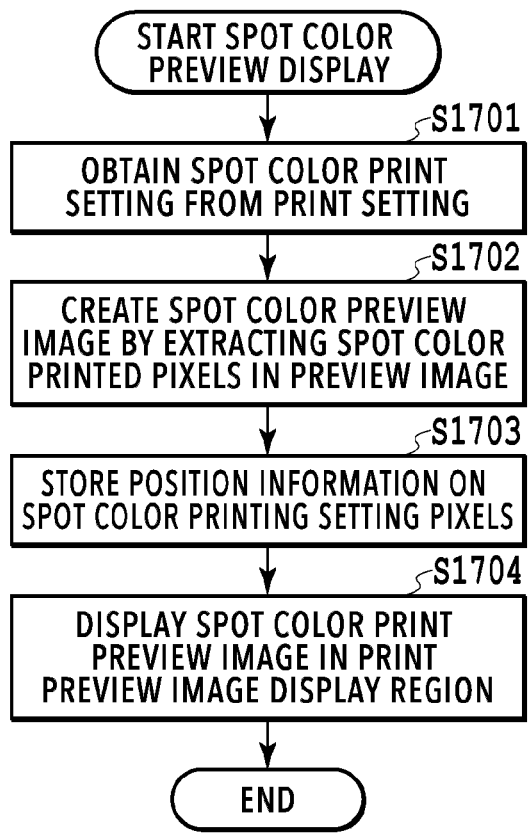
FIG. 17 is a flowchart showing the spot color preview display processing.

FIG. 17 is a flowchart showing spot color preview display processing in the present embodiment. Here, the series of processing shown in FIG. 17 is carried out by causing the CPU 111 of the host computer 101 to load program codes stored in the ROM 112 into the external storage device 114 and to execute the program codes. Alternatively, part or all of the functions of the steps in FIG. 17 may be realized by the hardware such as the ASIC and the electronic circuit.

The present embodiment will be described on the assumption that the user edits the data which the user wants to print on the application 202 by using the spot color ink and selects the print button 413 in the on state of the print preview setting item 411 in the print setting dialogue shown in FIG. 4 as the example as with the first embodiment. The print preview control unit 208 of the print preview application 206 executes the preview image display processing in accordance with the flowchart shown in FIG. 8 at the time of activation, thus displaying the print preview screen.

Now, the spot color preview display processing in the case where the spot color preview setting item 803 is on will be described with reference to the flowchart in FIG. 17. In the case where the spot color preview display processing is started, the print preview control unit 208 performs the processing from S1701 to S1702 by the control of the CPU 111. The processing in S1701 and the S1702 is the same as the processing in S901 and S902 in FIG. 9 of the first embodiment, and the description will be omitted herein.

Thereafter, the print preview control unit 208 stores position information on spot color printing setting pixels from the spot color preview image in S1703 by the control of the CPU 111. Here, the print preview control unit 208 stores coordinates of the pixels set to the spot color printing into columns x and y of a table shown in FIG. 18 to be described later.

FIG. 18 is a table showing a storage format for the coordinates of the pixels to be stored in S1703. The x coordinates and the y coordinates out of the coordinates of the pixels set to the spot color printing are stored, respectively.

Back to the flowchart in FIG. 17, the print preview control unit 208 carries out the display processing, which is the same as S903 in FIG. 9 of the first embodiment, in S1704 by the control of the CPU 111. Then, the spot color preview display processing is terminated.

Figure 19:
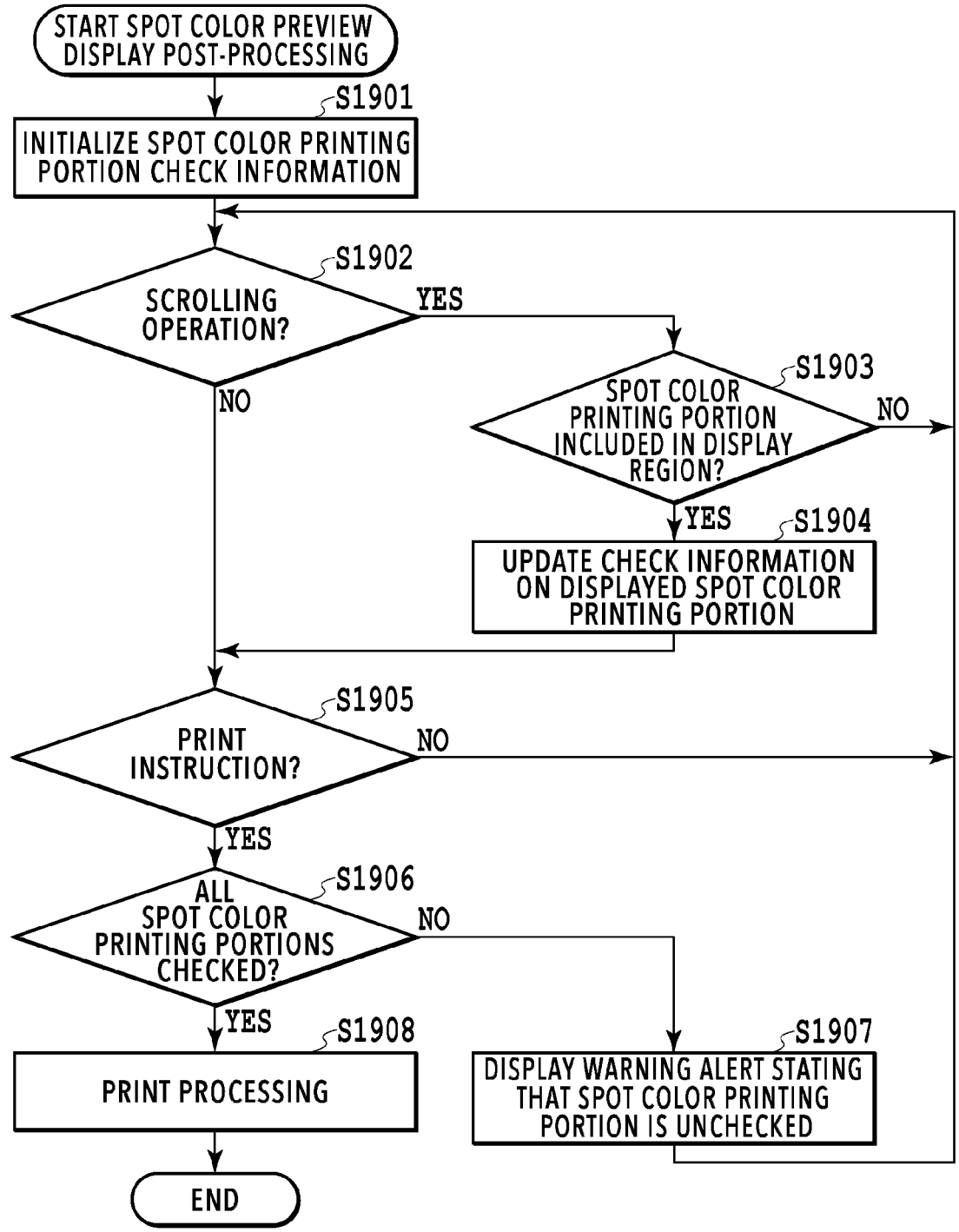
FIG. 19 is a flowchart showing spot color preview display post-processing.

FIG. 19 is a flowchart showing spot color preview display post-processing in the present embodiment. The series of processing shown in FIG. 19 is carried out after the series of processing shown in FIG. 17. Moreover, the series of processing shown in FIG. 19 is carried out by causing the CPU 111 of the host computer 101 to load program codes stored in the ROM 112 into the external storage device 114 and to execute the program codes. Alternatively, part or all of the functions of the steps in FIG. 19 may be realized by the hardware such as the ASIC and the electronic circuit.

The spot color preview display post-processing in FIG. 19 is the processing to be carried out after the spot color preview display processing described with reference to FIG. 17.

In the case where the spot color preview display post-processing is started, the print preview control unit 208 initializes spot color printing portion check information in S1901 by the control of the CPU 111. Here, the print preview control unit 208 resets values on a "checked" column in the table shown in FIG. 18 to zero. Thereafter, the print preview control unit 208 determines whether or not the user has carried out the scrolling operation in S1902 by the control of the CPU 111. The processing goes to S1905 in the case where the user has not carried out the scrolling, or goes to S1903 in the case where the user has carried out the scrolling. In the case where the scrolling has been carried out, the print preview control unit 208 determines whether or not the spot color printing portion is included in the region displayed in the spot color preview in S1903 by the control of the CPU 111. The processing goes to S1904 in the case where the spot color printing portion is included therein, and the print preview control unit 208 updates check information on the displayed spot color printing portion, and then sets a value 1 to the value on the "checked" column for the coordinates corresponding to the included spot color printing portion in the table shown in FIG. 18.

The processing returns to S1902 in the case where the print preview control unit 208 determines in S1903 that the spot color printing portion is not included. In the case of the determination in S1902 that the user has not carried out the scrolling operation, the print preview control unit 208 determines whether or not the print instruction is issued in S1905 by the control of the CPU 111. The processing returns to S1902 in the case where the print preview control unit 208 determines that the print instruction is not issued. In the case of the determination that the print instruction is issued, the print preview control unit 208 determines whether or not all the spot color printing portions (all printed pixels) have been checked (special printed pixel display determination) in S1906 by the control of the CPU 111. Regarding this check, the print preview control unit 208 determines that all the spot color print units have been checked in the case where all the values in the "checked" column of the table shown in FIG. 18 are set to the value 1. The processing goes to S1907 in the case where the all the spot color print units have not been checked. The print preview control unit 208 notifies the user of the presence of an unchecked spot color printing portion by displaying a warning alert (warning display) stating that the spot color printing portion is unchecked in S1907 by the control of the CPU 111. The processing goes to S1908 in the case where the all the spot color print units have been checked. Here, ordinary print processing is executed and then the spot color preview display post-processing is terminated.

Figure 20A:
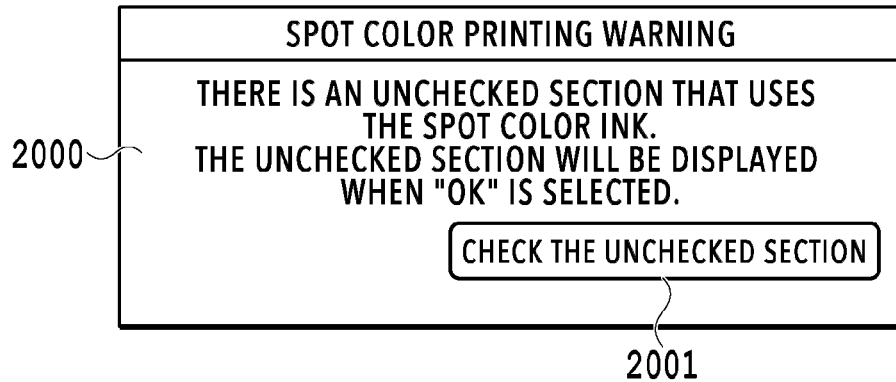
FIG. 20A is a diagram showing an example of a spot color printing warning alert.

FIG. 20A is a diagram showing an example of a spot color printing warning alert. The print preview control unit 208 closes this alert in the case where the user who has confirmed a warning message 2000 selects an unchecked section check button 2001. Then, the unchecked spot color printing portion is displayed by scrolling the spot color print preview display to the position that enables the check of the unchecked spot color printing portion.

Figure 20B:
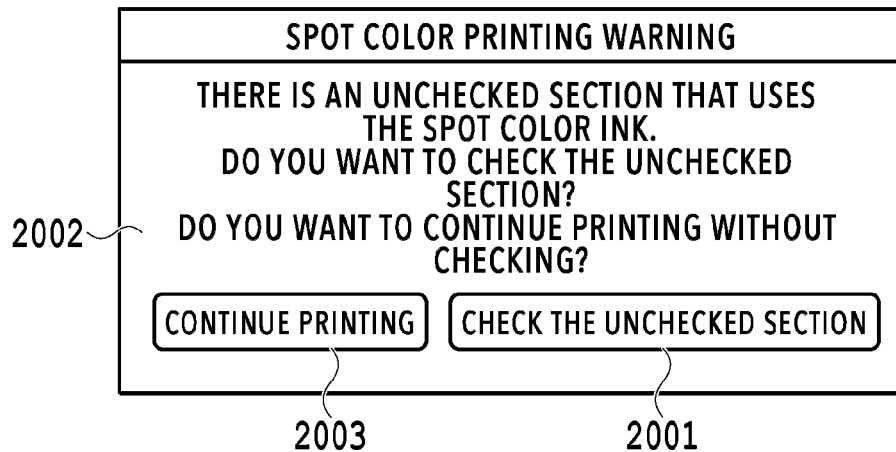
FIG. 20B is a diagram showing another example of the spot color printing warning alert.

FIG. 20B is a diagram showing another example of the spot color printing warning alert. In the case where the user who has confirmed a warning message 2002 further checks the unchecked section, the user selects the check button 2001. In the case where the check button 2001 is selected, the print preview control unit 208 closes this alert and scrolls the spot color print preview display to the position that enables the check of the unchecked spot color printing portion (after the warning). On the other hand, it is also possible to continue the printing if the user wants to carry out the printing in this state. In the case where the user who has confirmed the warning message 2002 wants to continue the printing, the user selects a continue button 2003. In the case where the continue button 2003 is selected, the print preview control unit 208 closes this alert and continues the print processing.

Figure 20C:
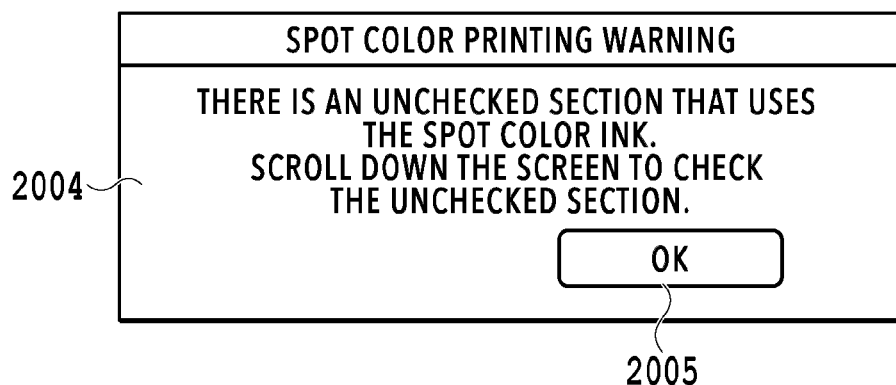
FIG. 20C is a diagram showing still another example of the spot color printing warning alert.

FIG. 20C is a diagram showing still another example of the spot color printing warning alert. The print preview control unit 208 displays a screen operating method necessary for checking an unchecked spot color printing portion in the form of a warning message 2004 (presents a mode of preview display). In the case where the user who has confirmed the warning message 2004 selects an OK button 2005, the print preview control unit 208 closes this alert and the user can check the unchecked spot color printing portion by executing the operating method displayed on the warning message 2004.

Any of the alerts shown in FIGS. 20A, 20B, and 20C may be displayed as the spot color printing warning alert.

According to the present embodiment, it is possible to suppress a printing failure by issuing the print instruction without checking all the spot color printing portions in the case where portions to be printed in the spot color are distant from each other, for instance.

Note that the above-described embodiments may be carried out in combination as appropriate.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-077448 filed Apr. 30, 2021, which is hereby incorporated by reference herein in its entirety.

What is claimed is:

1. A display method of displaying a preview image of a first image including an object to be printed in a process color and an object to be printed in a spot color, the method comprising:
    displaying, as the preview image of the first image, a first preview image including the object to be printed in the process color and the object to be printed in the spot color; and
    displaying, as the preview image of the first image, a second preview image not including the object to be printed in the process color but including the object to be printed in the spot color,
    wherein the first preview image is displayed at a first resolution, and
    wherein the second preview image is displayed at a second resolution different from the first resolution.

2. The display method according to claim 1, wherein a user instruction as to whether to display the first preview image or the second preview image as the preview image of the first image is accepted,
    wherein the first preview image is displayed in a case where a user instruction to display the first preview image is accepted, and
    wherein the second preview image is displayed in a case where a user instruction to display the second preview image is accepted.

3. The display method according to claim 1, wherein the first resolution is a resolution at which an entirety of the first preview image can be checked without scrolling a screen.

4. The display method according to claim 1, wherein the second resolution is a resolution at which the object to be printed in the spot color can be displayed.

5. The display method according to claim 1, wherein the first resolution is calculated based on a printing setting included in print data showing the image and on a size of a region where the preview image is displayed, and
    the second resolution is calculated based on a drawing command included in the print data and on the size of the region where the preview image is displayed.

6. The display method according to claim 5, wherein the preview image is displayed at a higher resolution out of the first resolution and the second resolution based on a comparison result obtained by comparing the first resolution which is calculated and the second resolution which is calculated.

7. The display method according to claim 1, wherein the second resolution is higher than the first resolution.

8. The display method according to claim 5, wherein in a case where there are two objects which differ in size and which are to be printed in the spot color, the second resolution is calculated by using a smaller object.

9. The display method according to claim 1, wherein whether or not all pixels corresponding to the spot color are displayed in a preview is determined in a case of reception of a print instruction to print the second preview image; and
    wherein a warning is displayed in a case where all the pixels are determined to be not displayed in the preview.

10. The display method according to claim 8, wherein the pixels corresponding to the spot color not displayed in the preview are displayed in a different preview after the warning.

11. A display apparatus comprising an image control unit configured to perform control to display a preview image of a first image including an object to be printed in a process color and an object to be printed in a spot color, wherein
    the image control unit performs control to display, as the preview image of the first image, a first preview image including the object to be printed in the process color and the object to be printed in the spot color, and to display, as the preview image of the first image, a second preview image not including the object to be printed in the process color but including the object to be printed in the spot color,
    wherein the first preview image is displayed at a first resolution, and
    wherein the second preview image is displayed at a second resolution different from the first resolution.

12. A non-transitory computer readable storage medium storing a program for causing a computer, in order to display a preview image of a first image including an object to be printed in a process color and an object to be printed in a spot color, to perform:
    a first preview image display step of displaying, as the preview image of the first image, a first preview image including an object to be printed in a process color and an object to be printed in a spot color; and
    a second preview image display step of displaying, as the preview image of the first image, a second preview image not including the object to be printed in the process color but including the object to be printed in the spot color,
    wherein the first preview image is displayed at a first resolution, and
    wherein the second preview image is displayed at a second resolution different from the first resolution.

* * * * *